(12) United States Patent
Naganuma et al.

(10) Patent No.: US 10,625,354 B2
(45) Date of Patent: Apr. 21, 2020

(54) AUTOMATED DRESSING UNIT FOR A CHAIN SAW

(71) Applicant: HITACHI KOKI CO., LTD., Tokyo (JP)

(72) Inventors: Kenji Naganuma, Ibaraki (JP); Kouji Sagawa, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 55 days.

(21) Appl. No.: 15/569,769

(22) PCT Filed: Apr. 15, 2016

(86) PCT No.: PCT/JP2016/062113
§ 371 (c)(1),
(2) Date: Oct. 27, 2017

(87) PCT Pub. No.: WO2016/175053
PCT Pub. Date: Mar. 11, 2016

(65) Prior Publication Data
US 2018/0133822 A1    May 17, 2018

(30) Foreign Application Priority Data

Apr. 28, 2015 (JP) ................................ 2015-092209

(51) Int. Cl.
*B23D 63/16* (2006.01)
*B23D 57/02* (2006.01)
(Continued)

(52) U.S. Cl.
CPC ......... *B23D 63/168* (2013.01); *B23D 57/023* (2013.01); *B27B 17/02* (2013.01); *B27B 17/10* (2013.01)

(58) Field of Classification Search
CPC ..... B23D 63/16; B23D 63/166; B23D 63/162
See application file for complete search history.

(56) References Cited

U.S. PATENT DOCUMENTS 3,889,556 A * 6/1975 Bair .................... B23D 63/168
76/80.5
4,991,476 A * 2/1991 Chow .................... A01F 29/22
241/101.2
(Continued)

FOREIGN PATENT DOCUMENTS

CN    201410591    2/2010
JP    S60-119504    8/1985
(Continued)

OTHER PUBLICATIONS

"International Search Report (Form PCT/ISA/210)", dated May 17, 2016, with English translation thereof, pp. 1-4.
(Continued)

*Primary Examiner* — Stephen Choi
*Assistant Examiner* — Fernando A Ayala
(74) *Attorney, Agent, or Firm* — JCIPRNET

(57) ABSTRACT

An operator operates a throttle lever and by maximizing the extent of said operation, the drive state is initiated, and the crank shaft rotation rate R increases and reaches the maximal value (RC) thereof. Subsequently, the operator operates the dressing operation lever so as to be in a second state at elapsed time (t0) while keeping the extent of the throttle lever operation maximized. Because a microswitch is turned off, the crank shaft rotation rate (R) is controlled in a range of R1<R<R2. By placing the saw chain in contact with a grindstone fixed to the dressing operation lever simultaneously with said action, dressing work is performed. After the microswitch is turned off at elapsed time (t0), the output of an ignition coil is controlled cyclically by a control unit at a cycle (T1+T2) so as to be on (ignition) during period (T1) and off (flame off) during period (T2).

14 Claims, 9 Drawing Sheets

(51) Int. Cl.
*B27B 17/02* (2006.01)
*B27B 17/10* (2006.01)

(56) References Cited

U.S. PATENT DOCUMENTS

| | | | | |
|---|---|---|---|---|
| 5,743,073 A * | 4/1998 | Paquet | ............... | A01F 29/22 |
| | | | | 241/101.2 |
| 6,058,806 A * | 5/2000 | Ford | ............... | B23D 63/168 |
| | | | | 76/80.5 |
| 7,073,421 B1 * | 7/2006 | Verhalen | ............ | B24B 3/463 |
| | | | | 451/422 |
| 9,288,941 B2 * | 3/2016 | Pollklas | ............ | A01D 43/08 |
| 2012/0222313 A1 * | 9/2012 | Seigneur | ............ | B23D 63/168 |
| | | | | 30/138 |

FOREIGN PATENT DOCUMENTS

| | | |
|---|---|---|
| JP | S61-020301 | 2/1986 |
| JP | H05-237836 | 9/1993 |
| JP | 2008-006525 | 1/2008 |
| JP | 2011-527647 | 11/2011 |
| JP | 2013-188947 | 9/2013 |

OTHER PUBLICATIONS

Office Action of China Counterpart Application, dated Apr. 29, 2019, pp. 1-9.
"Office Action of China Counterpart Application", dated Jan. 6, 2020, with English translation thereof, p. 1-p. 22.

* cited by examiner

AUTOMATED DRESSING UNIT FOR A CHAIN SAW

CROSS-REFERENCE TO RELATED APPLICATION

This application is a 371 application of the International PCT application serial no. PCT/JP2016/062113, filed on Apr. 15, 2016, which claims the priority benefits of Japan Patent Application No. 2015-092209, filed on Apr. 28, 2015, and Japan Patent Application No. 2016-072489, filed on Mar. 31, 2016. The entirety of each of the above-mentioned patent applications is hereby incorporated by reference herein and made a part of this specification.

TECHNICAL FIELD

The disclosure relates to a chain saw which performs a cutting operation by a saw chain that runs along a circumferential portion of a guide bar.

BACKGROUND ART

In a chain saw used for cutting trees or the like, a saw chain wrapped around a circumferential portion of a guide bar that extends forward from a main body is driven by a power source such as an engine or a motor provided in the main body. In this case, the saw chain is driven when a driving gear around which the saw chain is wrapped is rotationally driven, a side wrapped around the driving gear in the saw chain serves as a chain meshed with the driving gear, and a side opposite to the side wrapped around the driving gear and the guide bar serves as a cutting tool. Thus, a cutting operation can be performed by the saw chain that runs along the circumferential portion of the guide bar at a high speed. A structure of such a chain saw is described in Patent Literature 1. When the engine is used as a power source, a rotation shaft (driving shaft) of the driving gear and a crankshaft (power shaft) of the engine are connected via a centrifugal clutch. In an idling state in which a rotational speed of the crankshaft is kept low, the centrifugal clutch is not connected, and the driving gear and the saw chain are not driven.

An operator grips a rear handle provided at a rear part of the main body and a front handle which protrudes upward from a front part of the main body and is provided at a rear part of the guide bar, brings the vicinity of a front end of the guide bar into contact with trees or the like and thus can perform a cutting operation. A throttle lever for adjusting an output of the engine or a rotational speed of the crankshaft is provided at the rear handle. The operator operates (pulls) the throttle lever while gripping the rear handle, and can increase a rotational speed of the crankshaft. Thus, the centrifugal clutch is connected, and the driving gear and the saw chain are driven. In this state, the cutting operation can be performed.

Generally, in a cutting machine that performs a cutting operation using a cutting tool, a state of a cutting edge changes during repeated use, and cutting performance thereof decreases. In order to restore the cutting performance, generally, a dressing operation is performed for the cutting tool. This is the same as in a chain saw, and a dressing operation is performed for the saw chain. For example, as described in Patent Literature 2, the dressing operation is performed such that, while the chain saw is stopped, the operator grinds each cutting edge of the saw chain using a rod-like saw file or the like. In addition, a dressing operation can be performed by grinding cutting edges using a grinding stone. Since this operation is performed by bringing a driven saw chain into contact with a grinding stone for a dressing operation, and cutting the grinding stone in the same manner as in a general cutting operation, it can be performed much more easily than in the above case.

CITATION LIST

Patent Literature

Patent Literature 1
　Japanese Unexamined Patent Application Publication No. 2013-188947
Patent Literature 2
　Japanese Unexamined Utility Model Application Publication No. S60-119504

SUMMARY OF DISCLOSURE

Technical Problem

When an operator performs a dressing operation using a saw file or the like, it is possible to sufficiently restore cutting performance. However, work efficiency is low and furthermore, the operation is performed with a sensitivity depending on the operator. Thus, reproducibility thereof is not favorable.

On the other hand, when a dressing operation is performed by grinding using a grinding stone, work efficiency is high and reproducibility thereof is more favorable than in the above case. However, in this case also, it is in practice difficult to sufficiently restore cutting performance. The reason for this is as follows. Generally, the hardness of the grinding stone is higher than that of wood or the like to be cut using a chain saw. Therefore, when a saw chain that is running at the same speed as when a general cutting operation is performed is brought into contact with the grinding stone, during this operation, a cutting edge wears and heat is generated due to friction between the grinding stone and the cutting edge. Due to the heat, the strength of the saw chain decreases. Therefore, in this case, cutting performance of the saw chain may in practice deteriorate due to the dressing operation, and abrasion of the grinding stone becomes worse.

That is, a chain saw capable of performing an appropriate operation when a dressing operation is performed is desired.

The disclosure has been made in view of the above problems, and an object of the present disclosure is to provide a disclosure that addresses the above problems.

Solution to Problem

In order to address the above problems, the disclosure provides the following solutions. A chain saw of the disclosure includes a power shaft that rotates in a power source provided in a main body and a saw chain that is driven by the power shaft. The chain saw includes: a dressing unit configured to perform dressing of the saw chain, wherein the dressing unit includes a dressing member configured to perform dressing of the saw chain by contact with the saw chain that is in a driven state, wherein the chain saw further includes a controller configured to, in a case that the dressing unit is operated, perform a control different from a case that the dressing unit is not operated. The chain saw of the disclosure includes a detection unit in which a first state in which a position of the dressing member is on a side away from the saw chain and a second state in which a position of the dressing member is on a side close to the saw chain are set, and in which a transition of the dressing member from the first state to the second state, or a change from a state in which transition from the first state to the second state is not allowed to a state in which the transition is allowed, is detected, wherein, when the detection is performed by the detection unit, the controller determines that the dressing unit is operated. In the chain saw of the disclosure, the controller is connected to the detection unit and controls rotation of the power shaft based on a detection result of the detection unit. The chain saw of the disclosure includes a rotational speed adjusting unit configured to control a rotational speed of the power shaft according to an operation by an operator, wherein, when the detection unit detects that the dressing member has transitioned from the first state to the second state or the state in which the transition of the dressing member from the first state to the second state is not allowed has changed to the state in which the transition is allowed, the controller performs control such that a rotational speed of the power shaft is reduced irrespective of an operation of the rotational speed adjusting unit. The chain saw of the disclosure includes a rotational speed ascertaining unit configured to ascertain a rotational speed of the power shaft, wherein, when the detection unit detects that the dressing member has transitioned from the first state to the second state or the state in which the transition of the dressing member from the first state to the second state is not allowed has changed to the state in which the transition is allowed, the controller feeds back the rotational speed ascertained by the rotational speed ascertaining unit and reduces a rotational speed of the power shaft to be within a preset range. In the chain saw of the disclosure, when a predetermined time elapses after the detection unit ascertains that the dressing member has transitioned from the first state to the second state, the controller stops driving of the saw chain. In the chain saw of the disclosure, when the detection unit detects that the dressing member is in the second state and the saw chain is not driven, the controller restricts driving of the saw chain. In the chain saw of the disclosure, a third state may be set, in which for the dressing member, a position of the dressing member on a side is closer to the saw chain that that is in the second state, and the third state is ascertained by the detection unit, wherein, when the detection unit ascertains that the dressing member is in the third state, the controller stops driving of the saw chain. The chain saw of the disclosure includes a brake for braking rotation of a driving shaft that drives the saw chain, wherein, when the detection unit detects that the dressing member has transitioned from the first state to the second state or the state in which the transition of the dressing member from the first state to the second state is not allowed has changed to the state in which the transition is allowed, the controller brakes rotation of the driving shaft using the brake. In the chain saw of the disclosure, a notification unit configured to notify an operator that the dressing member is in the second state or the state is the state in which the transition from the first state to the second state is allowed is connected to the controller. In the chain saw of the disclosure, an abnormality display unit configured to issue a warning to the operator when control for stopping or restricting driving of the saw chain is performed is connected to the controller. In the chain saw of the disclosure, the detection unit detects a position of the dressing member. In the chain saw of the disclosure, the detection unit detects a contact state between the dressing member and the saw chain. In the chain saw of the disclosure, the dressing unit includes a lock lever in which the state in which the transition of the dressing member from the first state to the second state is not allowed and the state in which the transition is allowed are set, wherein the detection unit detects a state of the lock lever. In the chain saw of the disclosure, the dressing member is biased toward a side to be in the first state. In the chain saw of the disclosure the power source may be an engine, and the power shaft may be a crankshaft of the engine. In the chain saw of the disclosure the power source may be a motor, and the power shaft may be a rotation shaft of the motor.

Advantageous Effects of Disclosure

Since the disclosure is configured as described above, it is possible to obtain a chain saw capable of performing an appropriate operation when a dressing operation is performed.

DESCRIPTION OF EMBODIMENTS (First Embodiment)

A configuration of a chain saw according to a first embodiment of the disclosure will be described. In the chain saw, as in the chain saw described in Patent Literature 1, a power source (an engine) is provided in a main body, and a cutting operation is performed by a saw chain wrapped around a driving gear that is driven by the power source.

In the chain saw, a dressing operation of the saw chain can be performed by operating a dressing operation lever (dressing operation unit) mounted in the main body. Since a grinding stone used for a dressing operation is fixed to the dressing operation lever, there is no need to separately provide a grinding stone for a dressing operation. The state of the dressing operation lever includes a state (a first state) in which a general cutting operation is performed and a state which it is not possible to perform a general cutting operation and a dressing operation is performed and/or a state (a second state) in which the dressing operation lever is operated although the grinding stone and the saw chain are not in contact with each other. In the second state, the grinding stone moves closer to the saw chain than in the first state. Here, in this specification, while the state of the dressing operation lever is described as the first state, the second state, or a third state (to be described below), the first state, the second state, and the third state can be read as the state of the grinding stone in each state.

Figure 1:
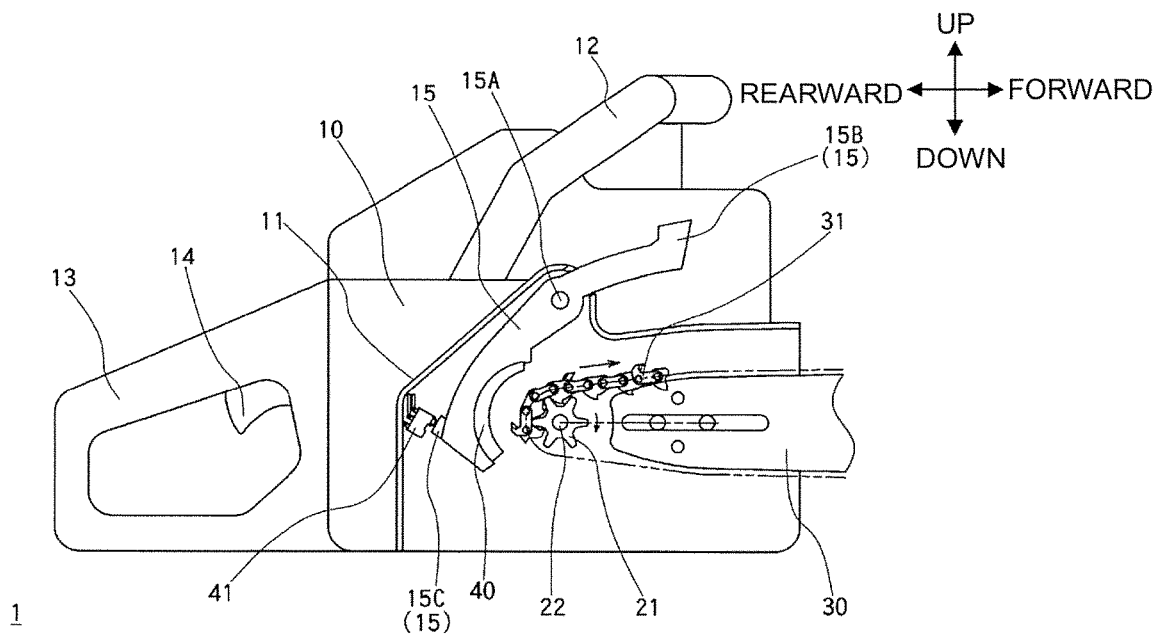
FIG. 1 is a side perspective view when a dressing operation lever of a chain saw according to a first embodiment of the disclosure is in a first state.

FIG. 1 shows a perspective view seen from a side showing a configuration around a driving gear 21 called a sprocket in a main body 10 of a chain saw 1 when the dressing operation lever is in the first state. In FIG. 1, an elongated guide bar 30 extends forward (to the right side in the drawing) from the vicinity of the driving gear 21, and a saw chain 31 is wrapped around circumferential portions (the upper and lower sides in FIG. 1) of the driving gear 21 and the guide bar 30. In FIG. 1, the driving gear 21 rotates clockwise and drives the saw chain 31. The guide bar 30 is fixed to the main body 10 so that an attachment position with respect to the main body 10 in a front-back direction thereof can be finely adjusted, and thus a tension of the saw chain 31 can be adjusted. An inner circumferential side (a side which comes in contact with the driving gear 21 and the guide bar 30) of the saw chain 31 is formed in a chain shape which is meshed with the driving gear 21 and is movable along the circumferential portion of the guide bar 30, and an outer circumferential side thereof is processed to have a sharp cutting edge. Thus, the saw chain 31 is driven by the driving gear 21 and a cutting operation can be performed by the saw chain 31 that runs along an outer periphery of the guide bar 30 at a high speed.

In addition, in FIG. 1, a part above the periphery of the driving gear 21 is surrounded by a cover attachment portion 11 provided to protrude toward the front side as shown in the drawing in the main body 10, and when the chain saw 1 is used, a cover (not shown) is mounted on the cover attachment portion 11. Thus, during a cutting operation, the periphery of the driving gear 21 is not exposed because it is covered with the cover, and a cutting operation can be performed using a portion of the guide bar 30 and the saw chain 31 of the main body 10 exposed in front thereof.

A driving shaft 22 which is a rotation shaft of the driving gear 21 is connected to a crankshaft (power shaft) of the engine serving as a power source via a centrifugal clutch (clutch) on the back side as shown in the drawing. However, in FIG. 1, a configuration on the engine side relative to the driving shaft 22 is not shown. The centrifugal clutch is fixed to the crankshaft, and the driving shaft 22 is fixed to a clutch drum that is provided to cover the outside of the centrifugal clutch. The operation state of the engine is broadly divided into an idling state in which the driving shaft 22 and the saw chain 31 are not driven and a driving state in which the driving shaft 22 and the saw chain 31 are driven. In the idling state, since a rotational speed of the crankshaft is kept low and the centrifugal clutch and the clutch drum do not come in contact with each other, even if the crankshaft rotates, the driving shaft 22 (the driving gear 21) is not driven. On the other hand, in the driving state, since a rotational speed of the crankshaft becomes higher, the centrifugal clutch and the clutch drum are in contact with each other and the centrifugal clutch is connected, the driving shaft 22 is driven by the crankshaft, and the driving gear 21 is driven. Both the cutting operation and the dressing operation are performed in the driving state.

An operator carries and uses the chain saw 1. Thus, an annular front handle 12 that is shaped to straddle the main body 10 from the upper side on the rear side of the guide bar 30 and gripped by one hand of the operator is provided in the main body 10. On the other hand, an annular rear handle 13 that is gripped with the other hand of the operator is provided at a rear part of the main body 10. A throttle lever 14 (rotational speed adjusting unit) for controlling an output of the engine or a rotational speed of the crankshaft is provided below the upper portion of the rear handle 13. When the throttle lever 14 is not operated, the engine is in the idling state, and the saw chain 31 stops. When the throttle lever 14 is operated (pulled upward) from this state, a degree of throttle opening of a carburetor connected to the engine increases, a rotational speed of the crankshaft becomes higher, the state is brought into the driving state, and the saw chain 31 is driven. Since the throttle lever 14 is biased to a side in the idling state, the engine is always in the idling state while the operator is not touching the throttle lever. In the driving state, a rotational speed of the crankshaft increases according to an operation amount (pulling amount) of the throttle lever 14. However, generally, a cutting operation is performed while the pulling amount of the throttle lever 14 is maximized (a rotational speed of the crankshaft is set to the maximum).

The above configuration is the same as that of a chain saw known in the related art. Here, in the chain saw 1, in the main body 10, a dressing operation lever (dressing operation unit) 15 is mounted in the vicinity of the driving gear 21. The dressing operation lever 15 functions as a grinding device configured to grind a cutting edge of the saw chain 31. The dressing operation lever 15 is mounted to be rotatable with respect to the main body 10 around a rotation shaft 15A, and is biased clockwise in FIG. 1 by a spring (not shown). In addition, as shown in FIG. 1, since the upper end (a lever upper portion 15B) of the dressing operation lever 15 protrudes to the outside of the cover attachment portion 11, even if the cover is mounted, the operator can operate the lever upper portion 15B to rotate the dressing operation lever 15 counterclockwise in the drawing against an elastic force of the spring.

On the side of the lower portion of the dressing operation lever 15, which faces the driving gear 21, a grinding stone (dressing member) 40 for a dressing operation including a surface having an arc shape along the saw chain 31 wrapped around the driving gear 21 is fixed. FIG. 1 shows a state in which the dressing operation lever 15 is not operated. In this case, the grinding stone 40 is separated from the saw chain 31 wrapped around the driving gear 21 and does not come in contact with the saw chain 31. This state is the first state and is a state in which the dressing operation lever 15 is not operated. In this state, when the operator operates the throttle lever 14 and the engine is in the driving state, the saw chain 31 is driven at a high speed, and a cutting operation can be performed. That is, the chain saw 1 is in a cutting operation.

Figure 2:
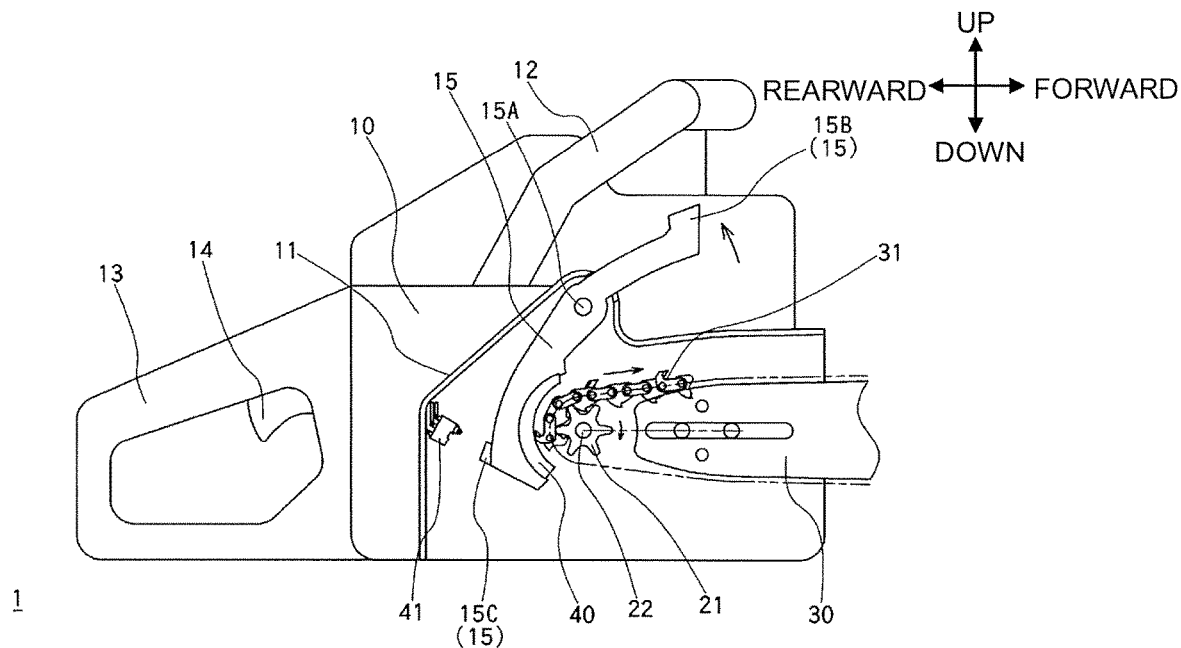
FIG. 2 is a side perspective view when the dressing operation lever of the chain saw according to the first embodiment of the disclosure is in a second state.

On the other hand, FIG. 2 shows a configuration when the dressing operation lever 15 is in the second state in the same manner as in FIG. 1. This state is a state in which the operator pulls the lever upper portion 15B upward against an elastic force of the spring, and the dressing operation lever 15 is rotated counterclockwise in FIG. 1 from the state in FIG. 1. Therefore, the grinding stone 40 comes in contact with the saw chain 31 wrapped around the driving gear 21. In this manner, when the operator pulls the lever upper portion 15B upward while the saw chain 31 is in a driven state, a dressing operation of the saw chain 31 is performed. That is, the second state is a state in which the dressing operation lever (grinding device) 15 is operated, and the chain saw 1 is in a dressing operation.

In this manner, when the dressing operation lever 15 having the above configuration is set to the second state (FIG. 2) from the first state (FIG. 1), a dressing operation in the chain saw 1 can be performed. In this case, since the dressing operation is performed in the inside covered with the cover attachment portion 11 (the cover) in FIGS. 1 and 2, scattering of dust and the like generated during the dressing operation is reduced.

Here, in the chain saw 1, according to an operation of the dressing operation lever 15, the engine is controlled, and particularly, a rotational speed of the driving gear 21 (the driving shaft 22) suitable for dressing is controlled. In other words, regarding the control of the rotational speed, a case in which a dressing operation is determined to be in progress, and a case in which a dressing operation is determined not to be in progress are differently controlled. Therefore, in order to ascertain whether the dressing operation lever 15 is in the first state or the second state, a microswitch (switch: detection unit) 41 is fixed to the main body 10 on the left side of the dressing operation lever 15 in FIGS. 1 and 2. In FIG. 1 showing the first state, a switch operation unit 15C which is a part of the dressing operation lever 15 comes in contact with and presses the microswitch 41, and the microswitch 41 is turned on. As described above, since the dressing operation lever 15 is biased clockwise in FIG. 1 by a spring, while no external force is applied to the dressing operation lever 15, a state in which the microswitch 41 is turned on continues.

On the other hand, in FIG. 2 in which the dressing operation lever 15 is in the second state, since the switch operation unit 15C is separated from the microswitch 41 to the right side in the drawing, the microswitch 41 is turned off. That is, when the state of the microswitch 41 has changed from an on state to an off state, it can be determined that the state has transitioned from the first state to the second state (the dressing operation lever 15 is operated). That is, in the embodiment of this application, the first state of the dressing operation lever 15 is a state in which a general cutting operation is performed and is a state in which the dressing operation lever 15 is not operated. Further, the second state of the dressing operation lever 15 is a state in which a general cutting operation is not performed but a dressing operation is performed and/or a state in which the dressing operation lever 15 is operated even if the grinding stone 40 and the saw chain 31 are not in contact with each other. In other words, the second state is a state in which the dressing operation lever 15 is operated. Here, when a pressure applied to the dressing operation lever 15 or the like is detected, it is possible to directly ascertain contact between the grinding stone 40 and the saw chain 31, and this state may be set as the second state of this application. However, according to the configuration of the embodiment of this application, since there is some delay between the first state and a state in which the grinding stone 40 and the saw chain 31 actually come in contact with each other, when a delay or the like occurs in control performed by a controller to be described below, it is possible to perform operation reliably, which is beneficial.

As described above, a rotational speed of the crankshaft (power shaft) of the engine is broadly divided into the idling state and the driving state when the engine is operated. This switching is performed by operation of the throttle lever (rotational speed adjusting unit) 14. Both the cutting operation and the dressing operation are performed in the driving state (in which the saw chain 31 is in a driven state). In the chain saw 1, there is provided a controller configured to restrict a rotational speed of the crankshaft despite the operation of the throttle lever 14 when the dressing operation lever 15 is switched from the first state to the second state (when the microswitch 41 is changed from an on state to an off state) in the driving state. When the microswitch 41 is switched from an on state to an off state, the controller performs control such that a rotational speed R of the crankshaft is within a range suitable for a dressing operation, $R1 < R < R2$.

In addition, the dressing operation is performed when the saw chain 31 that is driven and the grinding stone 40 come in contact with each other. Here, without being limited to a chain saw, generally, when a stopped saw chain and a grinding stone are in contact with each other and the saw chain is suddenly driven, a large force biased toward the cutting edge of the saw chain is applied, and there is a risk of the occurrence of deformation of the cutting edge and the like. Thus, when the dressing operation is performed, first, the saw chain is initially driven, and the driven saw chain and the grinding stone are brought in contact with each other in an appropriate procedure. When, this procedure is performed in reverse order, there is a risk of deterioration of the saw chain. The controller prevents the dressing operation from being performed in such an incorrect procedure. In other words, in the driving procedure, a case in which a dressing operation is determined to be in progress, and a case in which when a dressing operation is determined not to be in progress are differently controlled.

The controller will be described below. First, control of a rotational speed of the crankshaft during the dressing operation performed by the controller will be described. In the dressing operation, since it is necessary for the saw chain 31 to be in a driven state, a lower limit of a range of a rotational speed of the driving shaft 22 (the driving gear 21) is set to a sufficiently large value which is larger than 0 rpm and at which the dressing operation is possible. On the other hand, as described above, when the crankshaft is in the idling state, no power is transmitted to the driving shaft 22, and a rotational speed of the driving gear 21 becomes zero. That is, if a rotational speed of the crankshaft when the centrifugal clutch is connected is set to R0, the saw chain 31 stops at $0 \leq R < R0$, and if the rotational speed R of the crankshaft is greater than R0, power is transmitted by the centrifugal clutch, and the rotational speed of the driving shaft 22 (the driving gear 21) is equal to the rotational speed R of the crankshaft (power shaft). Thus, the lower limit value is $R1 > R0$.

In addition, generally, when the operator maximizes an operation amount of the throttle lever 14 and the rotational speed R of the crankshaft is set to a maximum value RC, a cutting operation is performed. However, when the dressing operation is performed in the state of R=RC, since wear and heat generation of the cutting edge of the saw chain 31 and the like occur, there is in practice a risk of deterioration of the saw chain 31 due to the dressing operation. Thus, R2<<RC is established, and R is controlled such that R0<R1<R<R2<<RC is established. R1 and R2 are set to correspond to a range in which a cutting performance of the saw chain 31 is sufficiently restored.

Figure 3A:
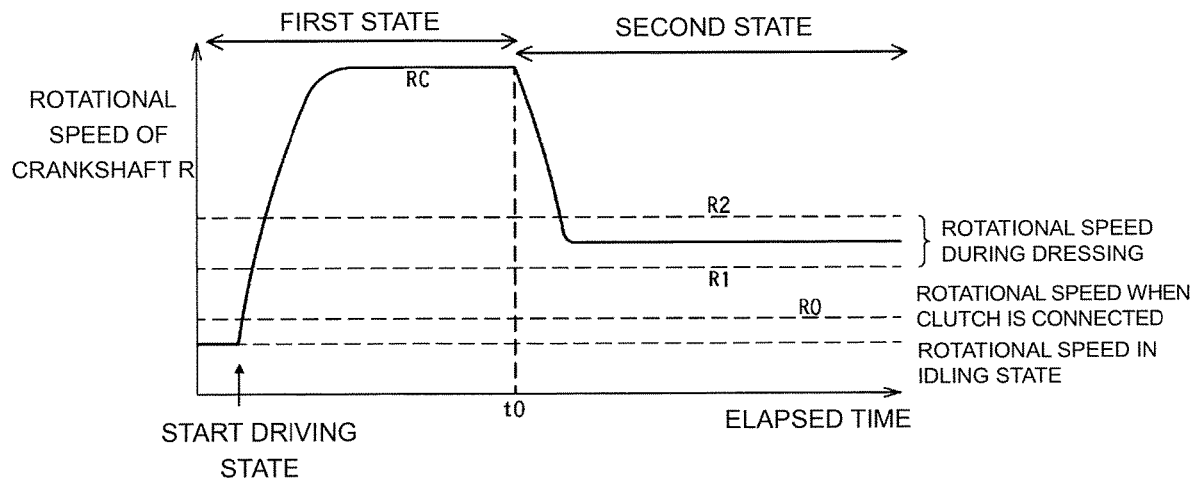
FIG. 3(a) shows time-lapse diagrams of a rotational speed of a crankshaft, FIG. 3(b) turning a microswitch on or off, and FIG. 3(c) an ignition state of an engine, before and after a dressing operation starts in the chain saw according to the first embodiment of the disclosure.
Figure 3B:
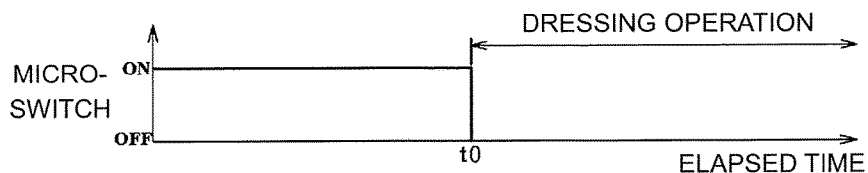

FIG. 3(a) and FIG. 3(b) show examples of the rotational speed R of the crankshaft when a dressing operation is performed in an appropriate procedure and on and off states of the microswitch 41 according to the passage of time. Here, the initial state is a state (the engine is in the idling state and the dressing operation lever 15 is in the first state) in which neither the throttle lever 14 nor the dressing operation lever 15 is operated. From this state, when the operator operates the throttle lever 14 and maximizes an operation amount thereof, the driving state is entered, and the rotational speed R of the crankshaft increases and reaches the maximum value RC. Then, at an elapsed time t0, while an operation amount of the throttle lever 14 is maximized, the operator operates the dressing operation lever 15 and the state is the second state. Thus, since the microswitch 41 is turned off, the rotational speed R of the crankshaft is controlled such that it is within a range of R1<R<R2. At the same time, the saw chain 31 comes in contact with the grinding stone 40 fixed to the dressing operation lever 15, and thus the dressing operation is performed.

In this case, the operator can perform the dressing operation of the saw chain 31 by simply operating the dressing operation lever 15 while an operation amount of the throttle lever 14 is maximized. Thus, the dressing operation is performed while a running speed of the saw chain 31 is appropriately adjusted, a cutting performance of the saw chain 31 can be improved, and wear of the grinding stone 40 is prevented.

Figure 4:
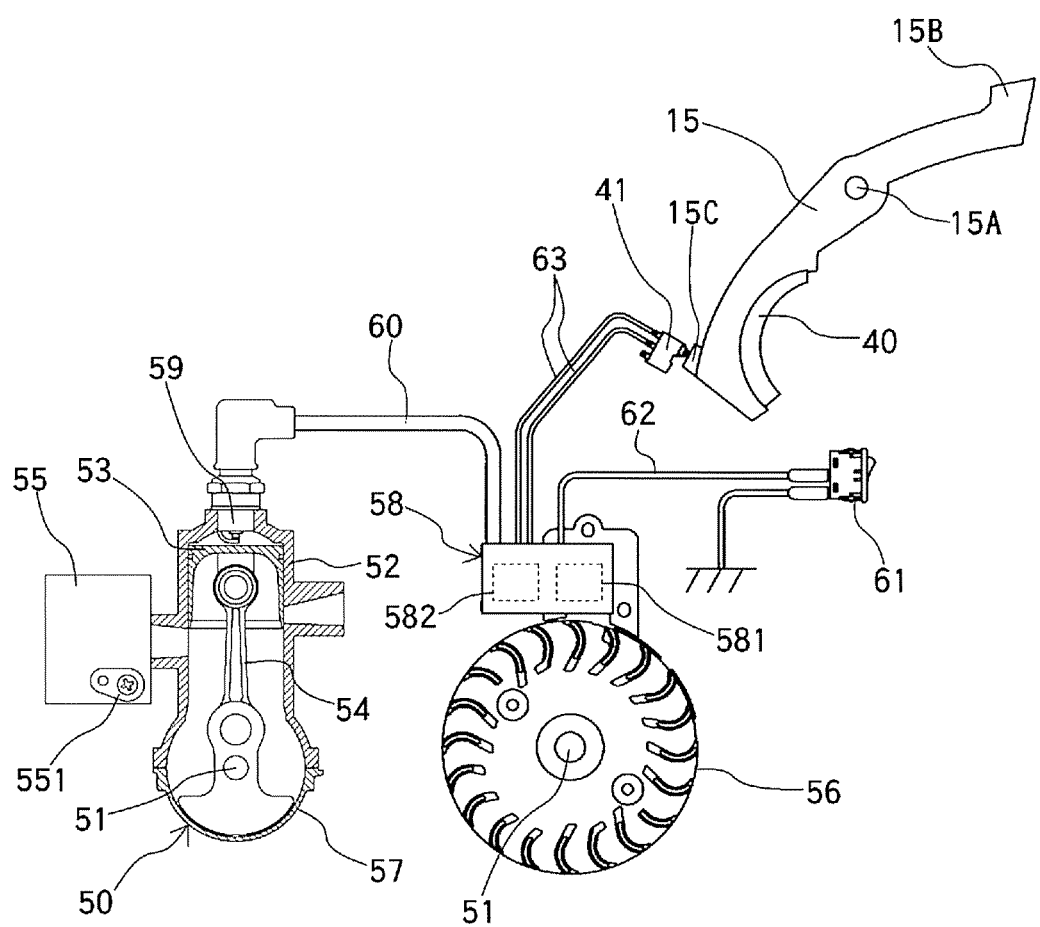
FIG. 4 is a diagram showing a configuration related to control of the engine in the chain saw according to the first embodiment of the disclosure.

FIG. 4 shows a control system when the above control is performed in the chain saw 1. Here, an engine 50 is used as a power source, and a crankshaft (power shaft) 51 rotates when it is connected to a piston 53 that moves up and down in a cylinder 52 with a connecting rod 54 therebetween. A rotational speed R or a rotational output of the crankshaft 51 is adjusted by an amount of an air-fuel mixture supplied by a carburetor 55 connected in the cylinder 52. This adjustment is set by a rotation angle of a throttle shaft 551 provided in the carburetor 55. The throttle shaft 551 is connected to the throttle lever 14 by a wire or the like to be linked with an operation of the throttle lever 14 in FIG. 1.

In addition, a magnet wheel 56 in which a permanent magnet is disposed is fixed to the crankshaft 51, and when the crankshaft 51 rotates, the magnet wheel 56 also rotates outside a crankcase 57. On the other hand, an ignition unit 58 configured to cause the engine 50 to perform an ignition operation is fixed to the cylinder 52 with a predetermined gap from the outer circumferential surface of the magnet wheel 56. When the magnet wheel 56 rotates, power is generated in a primary coil provided in the ignition unit 58. This power is increased in a secondary coil 581 that is provided in the same ignition unit 58, and is supplied to an ignition plug 59 mounted in the cylinder 52 through a high voltage cord 60. Since the ignition plug 59 ignites an air-fuel mixture compressed in the piston 53, this ignition timing (a timing at which power is supplied to the ignition plug 59) is set to close to a top dead center of the piston 53, and ignition is performed once at this timing for one rotation of the crankshaft 51.

In addition, an engine stop switch 61 is connected to the ignition unit 58 through a wiring 62. When the engine stop switch 61 is turned on and is switched to a ground side, since an output of the ignition unit 58 (a secondary coil 581) flows to the ground side through the engine stop switch 61, power supply to the ignition plug 59 is stopped and the engine 50 (the crankshaft 51) is stopped. The engine stop switch 61 is generally turned off (switched to the side opposite to the ground side), and is operated when the engine 50 under operation is stopped by the operator.

The above operation is similar to an operation of a generally known engine. Here, a control portion (controller) 582 configured to restrict power supplied to the ignition plug 59 according to an on or off state of the microswitch 41 is provided in the ignition unit 58. The microswitch 41 for ascertaining a state of the dressing operation lever 15 is connected to the ignition unit 58 (the control portion 582) through a wiring 63.

Figure 3C:
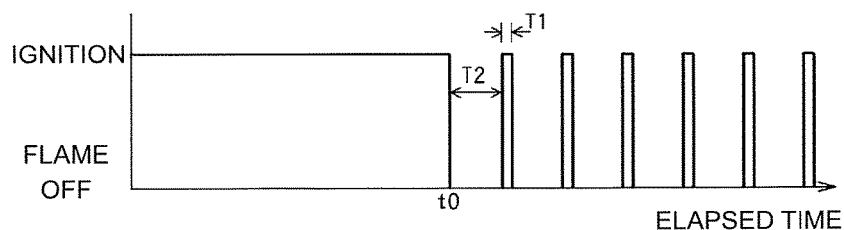

FIG. 3(c) is a diagram showing an output (power supply to the ignition plug 59) of the ignition unit 58 (the secondary coil 581) in this case according to the passage of time in correspondence with FIGS. 3(a) and FIG. 3(b). While the microswitch 41 is turned on before the elapsed time t0, a general operation is performed as described above, and the rotational speed R can be set to the maximum value RC according to the operation of the throttle lever 14. Here, as described above, precisely, since this power supply is performed only once for one rotation of the crankshaft 51, this power supply is actually discrete. This period is, for example, 0.1 msec when a rotational speed of the crankshaft 51 is 10000 rpm, which is extremely shorter than an on and off period of the microswitch 41 in FIG. 3(a), FIG. 3(b) and FIG. 3(c). Thus, continuous power supply is shown for convenience before the elapsed time t0 in FIG. 3(c).

After the microswitch 41 is turned off at the elapsed time t0, an output of the secondary coil 581 is periodically controlled by the control portion 582 according to a period T1+T2 in which the state is an on (ignition) state during a period T1 and the state is an off (flame off) state during a period T2. Here, during the period T1, similarly to a case in which the microswitch 41 is turned on, power supply (ignition) to the ignition plug 59 is performed whenever the crankshaft 51 rotates. On the other hand, during the period T2, since power supply is not performed, combustion for driving the crankshaft 51 is not performed during the period T2. When the microswitch 41 is turned off, since the period T1 and the period T2 are repeated, an output of the engine 50 is reduced as a result. Thus, it is possible to decrease the rotational speed R of the crankshaft 51 even if the state of the throttle shaft 551 (the throttle lever 14) is the same as when the microswitch 41 is turned on. Alternatively, even if the rotational speed R of the crankshaft 51 does not decrease instantly immediately after the microswitch 41 is turned off, since a rotational output of the crankshaft 51 decreases, the grinding stone 40 comes in contact with the saw chain 31, the driving gear 21 (the driving shaft 22) is braked, the crankshaft 51 is also braked, and the rotational speed R decreases. Thus, even if the state of the throttle shaft 551 (the throttle lever 14) is the same as when the rotational speed R of the crankshaft 51 is set to RC (maximum value) in FIG. 3(a), it is possible to decrease the rotational speed R of the crankshaft 51. When the T2/T1 ratio is large, a decrease in the rotational speed R is large.

Here, since power generated in the ignition unit 58 when the magnet wheel 56 rotates is periodically changed according to a rotation period of the magnet wheel 56 (the crankshaft 51), the control portion 582 can ascertain the rotational speed R of the crankshaft 51 according to this power. Thus, the control portion 582 can feed a current rotational speed R back to adjust T2/T1 and set the rotational speed R to be in a desired range (R1<R<R2). Here, as a method of decreasing or adjusting a rotational speed of the crankshaft 51 by adjusting power supplied to the ignition plug 59, other methods can be used. For example, in the period T2, instead of not performing ignition at all, a configuration in which there are fewer ignition timings, that is, one of a plurality of consecutive ignition timings corresponds to a flame off may be used. Alternatively, without setting T1 and T2, after the elapsed time t0, thinning out control such that ignition timings are regular may be performed, and thus control can be performed to decrease the rotational speed R of the crankshaft 51. In this case, it is possible to adjust the rotational speed R by adjusting a frequency after thinning out.

In this manner, in the chain saw 1, the control portion (controller) 582 configured to perform control such that the rotational speed R of the crankshaft 51 decreases despite the operation of the throttle lever (rotational speed adjusting unit) 14 is provided. The control portion 582 can ascertain an actual rotational speed R of the crankshaft 51 using an output of the secondary coil 581 or the primary coil used for supplying power to the ignition plug 59, that is, the secondary coil 581 is used as a rotational speed ascertaining unit. In this manner, the controller can control the rotational speed R of the crankshaft 51 using the rotational speed ascertaining unit.

FIG. 3(*a*), FIG. 3(*b*) and FIG. 3(*c*) show a state when the dressing operation is performed in an appropriate procedure. On the other hand, control in a case in which the operator drives the saw chain 31 when the dressing operation is performed in an incorrect procedure, that is, in a state in which the saw chain 31 is not driven and the grinding stone 40 and the saw chain 31 come in contact with each other or in a state (the second state) in which a dressing operation lever is operated even if the grinding stone 40 and the saw chain 31 are not in contact with each other will be described.

First, in this case, similarly, since the control portion 582 can ascertain the rotational speed R of the crankshaft 51, R0 is set as a threshold value. When R≤R0 is established, it is possible to determine that the saw chain 31 is not being driven. In addition, when the microswitch 41 is turned off, the control portion 582 can ascertain that the dressing operation lever 15 is in the second state. As described above, in order to prevent the dressing operation from being performed in an incorrect procedure, it is not desirable to drive the saw chain 31 from this state. Thus, the control portion 582 performs control such that the rotational speed R of the crankshaft 51 is not increased from that in this state. Thus, for example, the same control as control of a rotational speed during the dressing is performed to satisfy T2>>T1, a rotational output of the crankshaft 51 is reduced, and even if the throttle lever 14 is operated, it is possible to prevent the rotational speed R from increasing and the saw chain 31 from being driven.

Alternatively, in this case, when the throttle lever 14 or the throttle shaft 551 is mechanically fixed, the control portion 582 may prevent a rotational speed of the crankshaft 51 from increasing. In addition, as a threshold value for determination for performing the above control, the lower limit value R1 may be used in place of the above R0. In this case also, the same effect is obtained because the rotational speed of the crankshaft 51 is prevented from being sharply increased from a state below an appropriate range.

In this manner, in the chain saw 1, the control portion (controller) 582 also prevents the dressing operation from being performed in an incorrect procedure.

Figure 5:
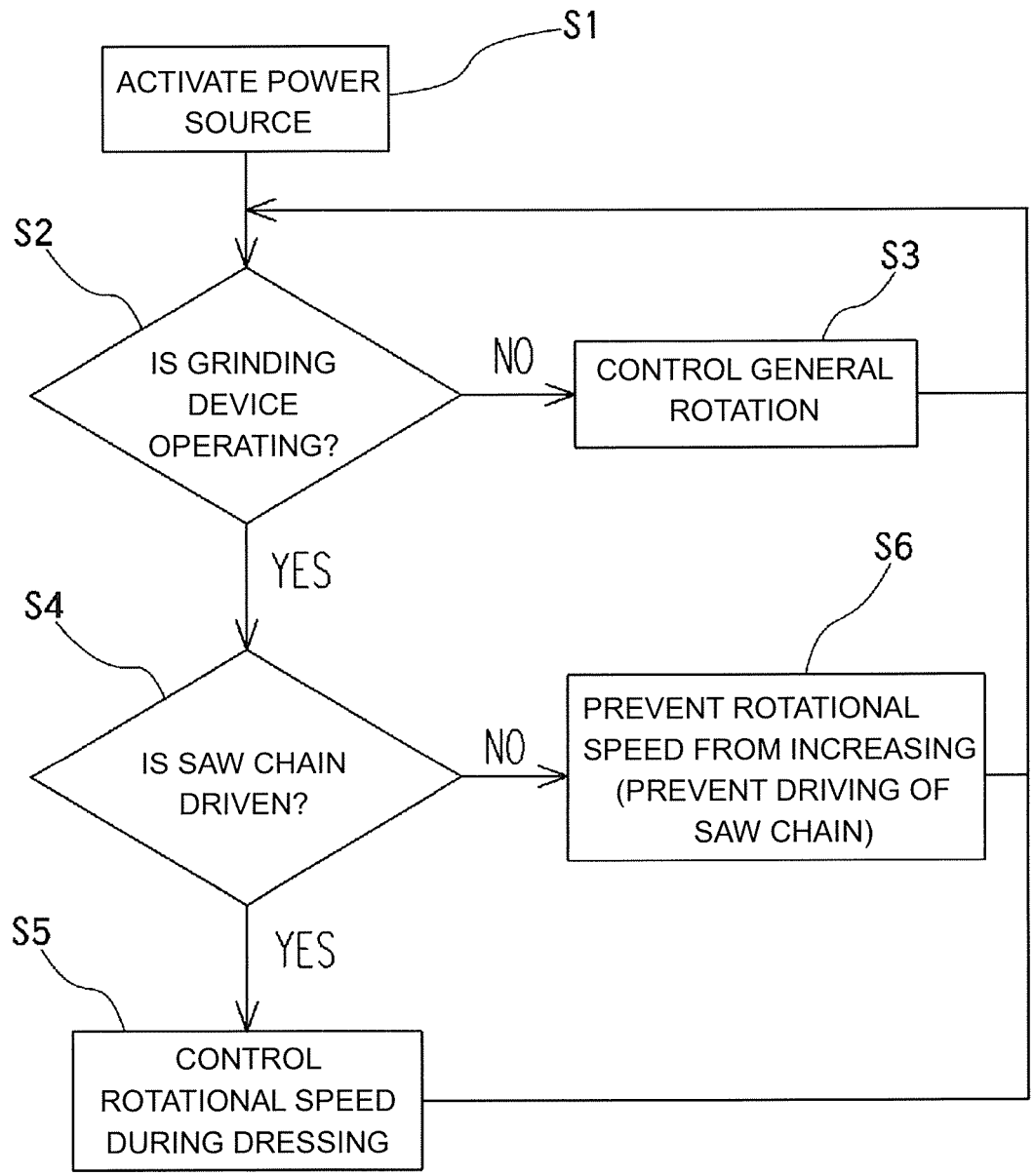
FIG. 5 is a flowchart showing operations of the chain saw according to the first embodiment of the disclosure.

FIG. 5 is a flowchart showing operations of the control portion 582 performed in the chain saw 1. Here, it is determined whether a cutting operation is performed or a dressing operation is performed, and the engine 50 (the rotational speed R of the crankshaft 51) is appropriately controlled according to each operation. In addition, in the dressing operation, control is performed such that no dressing operation is performed unless an appropriate procedure is performed.

Here, first, the engine (power source) 50 is initially started (activated) (S1). As described above, irrespective of whether the engine 50 is in the idling state or the driving state, when the engine 50 is operated, this can be ascertained by the rotational speed ascertaining unit.

Next, the control portion 582 deteiiniines whether the dressing operation lever (dressing operation unit: grinding device) 15 is operated by ascertaining whether the microswitch 41 is turned off or on (S2). When it is determined that the dressing operation lever 15 is not operated (the microswitch 41 is turned on: the first state), the control portion 582 performs general engine control irrespective of a current state of the engine 50 as shown in FIG. 3(*c*) (S3). Accordingly, as shown in FIG. 3(*a*), when the operator maximizes an operation amount of the throttle lever 14, a rotational speed R of a crankshaft 51 reaches the maximum value RC, and the saw chain 31 is driven at a high speed. In this state, the operator can perform a cutting operation. Then, the state of the microswitch 41 is determined again (S2), and unless the dressing operation lever 15 is operated, this state continues, and the operator can perform a cutting operation.

On the other hand, when it is determined that the microswitch 41 is turned off (the dressing operation lever 15 is in the second state: the grinding device is operated) (YES in S2), the control portion 582 determines whether the saw chain 31 is currently being driven (S4). As described above, this can be ascertained using the rotational speed R of the crankshaft 51 (the state of the engine 50). Alternatively, a unit configured to ascertain operation states of the driving shaft 22 (the driving gear 21) and the saw chain 31 may be provided, and the determination may be performed using this unit.

When it is ascertained that the saw chain 31 is being driven (YES in S4), it is determined that a dressing operation should be started in order to perform a procedure for performing a dressing operation appropriately. Thus, as described above, control is performed such that the rotational speed R of the crankshaft 51 satisfies R1<R<R2 (S5). Accordingly, the dressing operation is performed in an appropriate state.

On the other hand, when it is ascertained that the saw chain 31 is not being driven (NO in S4), as described above, it is not preferable to drive the saw chain 31 from this state. Thus, as described above, the control portion 582 performs control such that the rotational speed R of the crankshaft 51 is not increased (S6). In this case, as described above, when this control is performed by restricting ignition, the saw chain 31 is not driven despite the operation of the throttle lever 14, and the operator can ascertain that a procedure for the dressing operation is not appropriately performed.

In this case, the operator can immediately release his or her hand from the dressing operation lever 15 (S2), operate the throttle lever 14 again to increase the rotational speed R of the crankshaft 51, and drive the saw chain 31 (S3). Then, when the dressing operation lever 15 is operated again (S2), since the saw chain 31 is driven this time (S4), a dressing operation is performed while the rotational speed R of the crankshaft 51 is restricted (S5).

As described above, when control for mechanically fixing the throttle lever 14 or the throttle shaft 551 is performed in order to prevent the rotational speed R of the crankshaft 51 from increasing (S6), the operator can ascertain that the control has been performed in response to the operation of the throttle lever 14. In this case, when setting is performed such that, if the microswitch 41 is switched from an off state to an on state, this fixing is released, the same operation as in the above is performed and thus the dressing operation can be performed. That is, when a procedure for performing a dressing operation is not appropriately performed, the operator appropriately performs the procedure for performing a dressing operation again after his or her hand is released from the dressing operation lever 15, and thus the dressing operation can be performed again.

In this manner, in the chain saw 1, when the operator operates the dressing operation lever 15 and the throttle lever 14, both the cutting operation and the dressing operation can be appropriately performed. Thus, a favorable dressing operation is performed for the saw chain 31 with favorable reproducibility.

Here, in the above example, when the dressing operation lever 15 is in the second state, the rotational speed R of the crankshaft 51 is adjusted to be within a certain range (between R1 and R2) that is lower than the maximum value RC. Here, control may be performed such that R1 and R2 are set to values close to each other and the rotational speed R is constant in the second state.

However, a time required for one dressing operation (a time for which the grinding stone 40 continuously comes in contact with the saw chain 31) is actually, for example, about several seconds, in many cases, and is much shorter than a time required for one cutting operation. Thus, actually, even if precise control of the rotational speed R as described above is not performed during the dressing operation and the rotational speed R is simply decreased only for this short period, sufficient effects are obtained. In such a case, when a value of the rotational speed R immediately after control for decreasing the rotational speed R is performed is reproducible, reproducibility of the dressing operation can be sufficiently high. In this case, for example, it is determined that the dressing operation should be performed in a state in which an operation amount of the throttle lever 14 is maximized, and the rotational speed R immediately after control for decreasing the rotational speed R is performed in this state may be set to be within the above range of R1 and R2. Thus, a favorable dressing operation can be performed with favorable reproducibility.

In addition, in the above example, ignition control of the engine 50 is performed irrespective of an operation amount of the throttle lever 14, and control for decreasing the rotational speed R is performed. However, for example, when the throttle lever or the throttle shaft is mechanically pushed back and an operation amount (that is, an amount of fuel and air) of the throttle lever is forcibly changed, it is possible to decrease the rotational speed R. In this case also, for example, it is possible to determine that the dressing operation is should be performed in a way in which an operation amount of the throttle lever is maximized. Then, the dressing operation lever is operated (S2), and when it is ascertained that the saw chain is being driven (S4), and the throttle lever is mechanically push-back controlled from a position at which an operation amount thereof is maximized to a position during the dressing operation at which an operation amount is smaller than at the above position, the rotational speed R can be decreased (S5). The position during the dressing operation is a position at which the operation amount is between the minimum (the idling state) and the maximum. This operation can be performed, for example, when a control portion (controller) causes a current to flow in a solenoid coil (the solenoid coil is turned on). When setting is performed such that, if the operator releases his or her hand from the dressing operation lever, the solenoid coil is turned off, the operation in FIG. 5 can be performed in the same manner. In this case, the control portion can adjust the rotational speed R to be within a predetermined range by adjusting a push-back amount of the throttle lever.

As a configuration for realizing the above operation, a configuration other than those shown in FIGS. 1 and 2 can be used. For example, the position and the configuration of the microswitch are arbitrary as long as it is possible to detect that the dressing operation lever 15 has been switched from the first state (FIG. 1) to the second state (FIG. 2). However, a set angle of the dressing operation lever 15 in the second state (FIG. 2) is restricted when the grinding stone 40 and the saw chain 31 are in contact with each other. In this case, since the grinding stone 40 wears when it is used repeatedly, a set angle of a dressing operation lever 15 in the second state (FIG. 2) changes depending on a wear state of the grinding stone 40. For example, when the grinding stone 40 has worn more than in the state shown in FIG. 2, the set angle moves to the counterclockwise side relative to the state in FIG. 2. Even in such a case, in the above configuration, since the microswitch 41 is reliably turned off immediately after the dressing operation lever 15 is operated, this operation can be reliably ascertained. In addition, in such a configuration, since adjustment (decrease) of the rotational speed R of the crankshaft 51 is started immediately before the grinding stone 40 comes in contact with the saw chain 31, a running speed of the saw chain 31 when the saw chain 31 and the grinding stone 40 actually come in contact with each other is further optimized.

In addition, in the above configuration, dust generated during the dressing operation is scattered toward the microswitch 41, which may cause a malfunction of the microswitch 41, and a lifespan thereof may be shortened. On the other hand, when the dressing operation lever 15 is provided between the microswitch 41 and the driving gear 21, scattering of dust toward the microswitch 41 is prevented. Thus, a configuration in which the microswitch 41 is provided as in FIGS. 1 and 2 is particularly preferable.

(Second Embodiment)

In the chain saw 1, the first state (a state in which a general cutting operation is performed) and the second state (a state in which no general cutting operation is performed, and alternatively, a dressing operation of the saw chain 31 is performed) are set, and switching therebetween is performed by the dressing operation lever (dressing operation unit) 15. Actually, in the first state (a state in which the operator is not touching the dressing operation lever 15), the operator performs a cutting operation. In this case, for example, when the operator ascertains that a cutting speed becomes slow, the dressing operation is performed, and thus the cutting speed can be restored (improved).

However, the grinding stone (dressing member) 40 and the saw chain 31 are expendable items that wear whenever they are used. In a state in which wearing thereof progresses, that is, when the end of a service lifespan thereof approaches, it is preferable to replace the grinding stone 40 and the saw chain 31 rather than perform the dressing operation. Thus, in such a case, the dressing operation is not performed even when the operator intends to perform the dressing operation, and alternatively, it is effective to inform the operator of the fact that the end of the service lifespan has been reached. In a chain saw 2 according to the second embodiment, when the operator intends to perform the dressing operation, when it is determined that wearing of the grinding stone 40 and the saw chain 31 has progressed, a state (the third state) in which the dressing operation is not performed and driving of the saw chain 31 is stopped is also set in addition to the first and second states.

In addition, when the dressing operation is performed in the second state, if the dressing operation is excessively performed, deterioration and abrasion of the grinding stone 40 and the saw chain 31 may occur due to heat generation. Thus, it is preferable to perform the dressing operation in the second state only for a predetermined set time. Thus, in the chain saw 2, in the second state, after a set time elapses, driving of the saw chain 31 is stopped.

Figure 6:
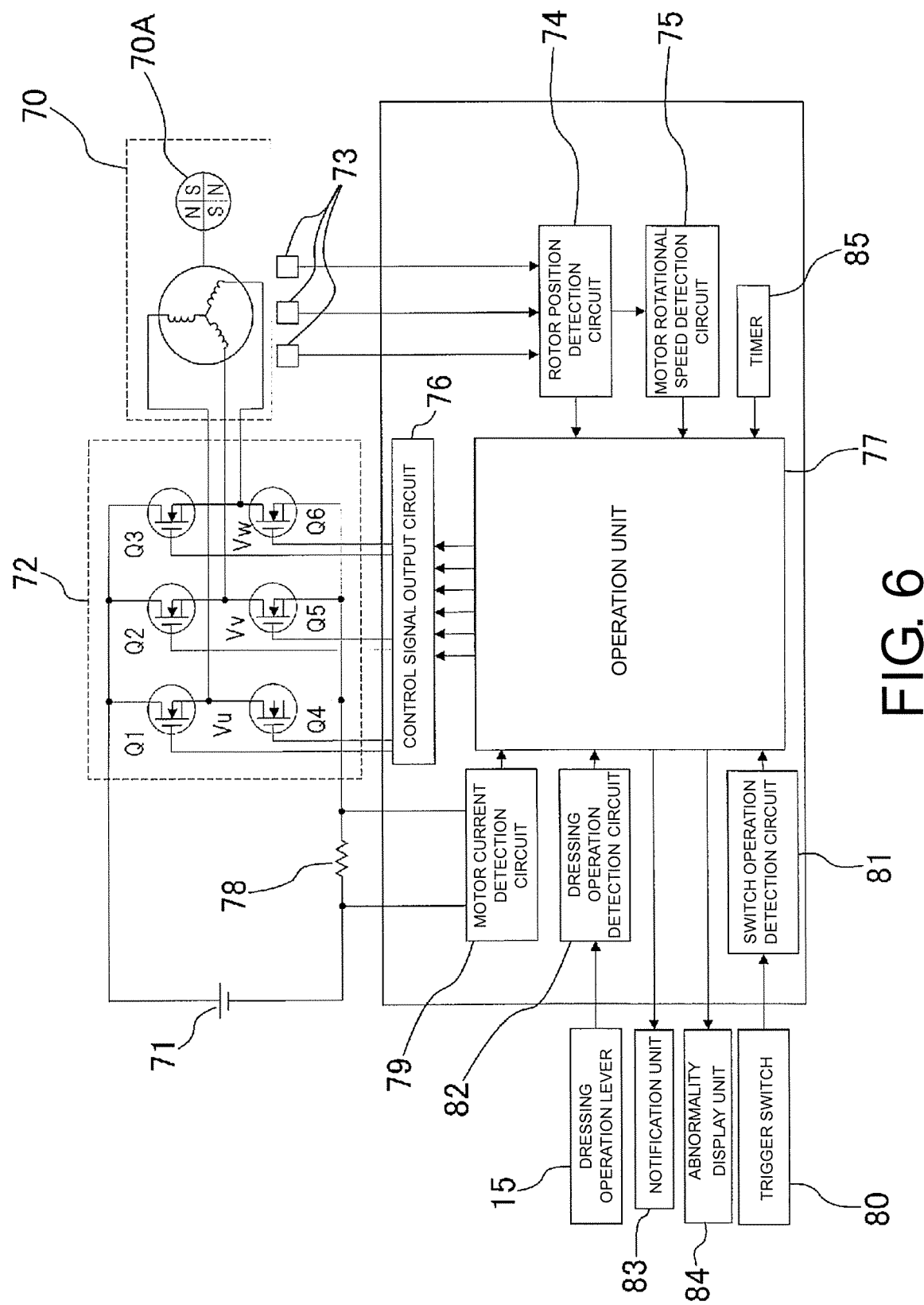
FIG. 6 is a block diagram showing a configuration related to control in a chain saw according to a second embodiment of the disclosure.

In addition, in the chain saw 1, the engine 50 is used as a power source. On the other hand, in the chain saw 2 according to the second embodiment, a motor is used as a power source. FIG. 6 is a block diagram showing a configuration related to control of the chain saw 2.

A motor 70 used as a power source here is a well-known three-phase direct current (DC) brushless motor. The motor 70 is driven by a DC voltage from a battery 71, and when the DC voltage is sequentially switched and supplied to a three-phase coil (a U phase, a V phase, and a W phase) by an inverter 72, a rotor (rotor: rotation shaft) 70A to which a permanent magnet is fixed rotates. In this case, a rotor position detection circuit 74 ascertains an actual rotation position of the rotor according to outputs of three position sensors 73 provided at a phase interval of 120° in a circumferential direction of rotation, and accordingly, a motor rotational speed detection circuit (rotational speed ascertaining unit) 75 can ascertain an actual rotational speed (rotational speed). The inverter 72 includes six switching elements (Q1 to Q6), and a control signal output circuit 76 controls on and off of gates of Q1 to Q6 so that the motor 70 performs an appropriate rotation operation. The rotor 70A serves as a power shaft in the chain saw 2.

An operation unit (controller) 77 including a microprocessor controls the entire chain saw 2. Thus, the operation unit 77 controls a rotational speed of the motor 70 through the control signal output circuit 76 according to information about a rotational speed of the rotor obtained by the motor rotational speed detection circuit 75. In this case, a current actually supplied for driving the motor 70 can be ascertained when a voltage at both ends of a current detection resistor 78 is detected by a motor current detection circuit 79, and this information is also input to the operation unit 77. Thus, the operation unit 77 can precisely control rotation of the motor 70. In addition, when the current has an abnormal value (for example, an excessive value), it is determined that an abnormality has occurred in the motor 70, and the operation unit 77 can stop driving of the motor 70 (supply of a current to all coils). In addition, unlike the chain saw 1 in which the centrifugal clutch is used between the engine 50 and the driving shaft 22, in the chain saw 2, no centrifugal clutch is used, and rotation of the rotor 70A in the motor 70 is directly connected to rotation of the driving shaft (driving of the saw chain 31). Thus, on and off driving of the saw chain 31 is controlled by a trigger switch (rotational speed adjusting unit) 80, and the state (on and off) of the trigger switch 80 is detected by a switch operation detection circuit 81. The operation unit 77 controls on and off of the motor 70 according to the state of the trigger switch 80. As the trigger switch 80, not only a simple on or off switch for the motor 70 but also a changeover switch capable of gradually switching a rotational speed of the motor 70 during a cutting operation may be used. In this case, for example, it is possible to set switching of a rotational speed according to the operation amount (pulling amount).

Figure 7:
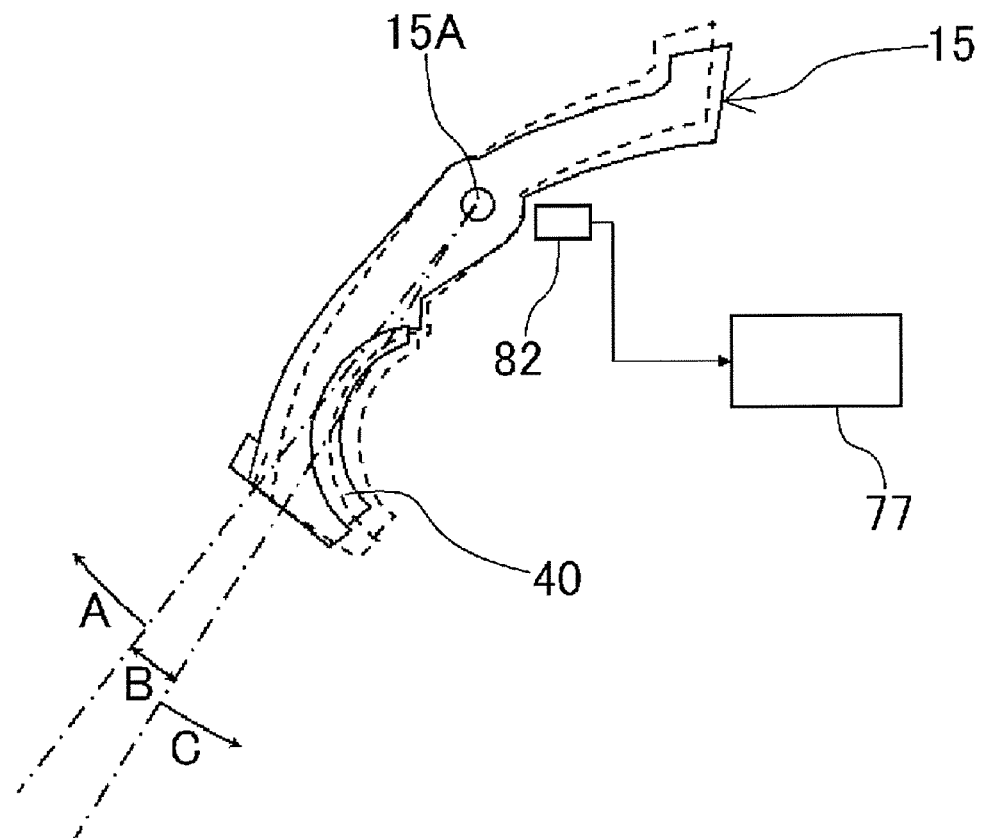
FIG. 7 is a diagram schematically showing three states of a dressing operation lever in the chain saw according to the second embodiment of the disclosure.

Here, similarly, the dressing operation lever (dressing operation unit) 15, the driving gear 21 (the driving shaft 22), the saw chain 31, and the grinding stone 40 (dressing member) are used in the chain saw 2. Thus, as shown in FIGS. 1 and 2, when the dressing operation lever 15 is caused to rotate around the rotation shaft 15A while the driving gear 21 rotates, the grinding stone 40 comes in contact with the saw chain 31, and the dressing operation can be performed. FIG. 7 is a diagram schematically showing a movement of the dressing operation lever 15 at this time. As described above, the dressing operation lever 15 is biased clockwise (a direction in which the grinding stone 40 and the saw chain 31 are separated from each other) in FIGS. 1, 2, and 7, and when a set angle in FIG. 7 is in a range of A, the state is brought into the first state. In this case, a rotational speed of the motor 70 is set to be high so that a cutting operation is appropriately performed. On the other hand, when the dressing operation lever 15 rotates counterclockwise from this state and the grinding stone 40 and the saw chain 31 come in contact with each other, it is not possible to rotate the dressing operation lever 15 counterclockwise any further. In this case, when the dressing operation is performed, the state is brought into the second state, and a rotational speed of the motor 70 is set to be a low value that is suitable for the dressing operation.

Here, an angle of the dressing operation lever 15 when the grinding stone 40 and the saw chain 31 are in contact with each other changes depending on the wear state of the grinding stone 40 and the saw chain 31. When such wearing progresses, the dressing operation lever 15 in FIG. 7 rotates further counterclockwise. Thus, in FIG. 7, a range of a set angle of the dressing operation lever 15 corresponding to a case in which wearing of the grinding stone 40 and the saw chain 31 does not progress and the dressing operation is appropriately performed can be set to B. In a range of C which is on the counterclockwise side relative to B, it is estimated that wearing of the grinding stone 40 and/or the saw chain 31 has progressed. In addition, since the grinding stone 40 is detachable so that it can be replaced when it is worn, the grinding stone 40 may not be mounted in the dressing operation lever 15. In addition, the saw chain 31 may be detached from the sprocket 21 for maintenance or convenience during transportation. Also in such an abnormal state, a set angle of the dressing operation lever 15 is in a range of C.

Thus, in the chain saw 2, according to a set angle of the dressing operation lever 15, when this angle is in the range of A, the state can be determined as the first state, when this angle is in the range of B, the state can be ascertained as the second state, and when this angle is in the range of C, the state can be determined as the third state. Since the dressing operation lever 15 is biased clockwise, when the dressing operation lever 15 is not operated, the state is the first state, and when the dressing operation lever 15 is operated, the state is the second state or the third state. When the state is the second state, a general cutting operation can be performed in the first state after the dressing operation is completed. However, when the state is the third state, it is necessary to replace (mount) the grinding stone 40 and the saw chain 31 without performing the dressing operation.

In the chain saw 1 of the first embodiment, the microswitch (detection unit) 41 ascertains switching between the first state and the second state. In the second embodiment, when an angle sensor configured to ascertain a set angle (rotation angle) of the dressing operation lever 15 is connected to a dressing operation detection circuit (detection unit) 82 connected to the operation unit 77 in FIG. 6, the dressing operation detection circuit 82 can identify the above ranges A, B, and C. In this case, when the angle sensor is provided in the vicinity of the rotation shaft 15A, this identification can be performed. As the angle sensor, known sensors, for example, a rotary encoder configured to detect a code provided in the rotation shaft 15A, can be used. In this case, it is not necessary to accurately detect a set angle of the rotation shaft 15A, and it is sufficient to identify the above ranges. When the dressing operation detection circuit (detection unit) 82 in FIG. 6 using such an angle sensor is used, the operation unit (rotational speed adjusting unit) 77 in FIG. 6 can ascertain whether the dressing operation lever 15 is in the first state, the second state, or the third state. When the trigger switch 80 is turned on, the operation unit 77 controls a rotational speed of the motor 70 according to such a state, which will be described below.

In addition, in the configuration of FIG. 6, a notification unit 83 indicating that the dressing operation lever 15 is operated and the dressing operation is being performed (in the second state) and an abnormality display unit 84 indicating that the dressing operation lever 15 is operated but the state is the third state and no dressing operation is performed are used. Here, as the notification unit 83, and the abnormality display unit 84, for example, individual light emitting diode (LED) elements, can be used. In addition, as will be described below, since the notification unit 83 and the abnormality display unit 84 do not operate at the same time, the same LED element may be used therefor, and when the notification unit 83 and the abnormality display unit 84 operate, lighting methods thereof (for example, light off, lighted up, blinking, or a combination thereof) may be differently set. Like a rotational speed of the motor 70, operations of the notification unit 83 and the abnormality display unit 84 are controlled by the operation unit 77. As in the chain saw 1, when the engine 50 having a large operation sound is used as a power source, the operator can easily ascertain that the state is the second state and a rotational speed has decreased or that the state is the third state and a rotational speed has further decreased using an operation sound. However, when a very quiet motor 70 is used, since it is difficult to ascertain such a state using an operation sound in some cases, the notification unit 83 and the abnormality display unit 84 are particularly effective. In other words, regarding the operation of the notification unit, a case in which the state is determined to be a dressing state and a case in which the state is determined not to be an operation state are differently controlled.

In addition, as described above, in order to restrict a time for which the dressing operation is performed in the second state, it is necessary to ascertain a time elapsed from when the dressing operation starts. Thus, a timer 85 configured to measure a time elapsed from when the second state is entered is also connected to the operation unit 77.

Figure 8:
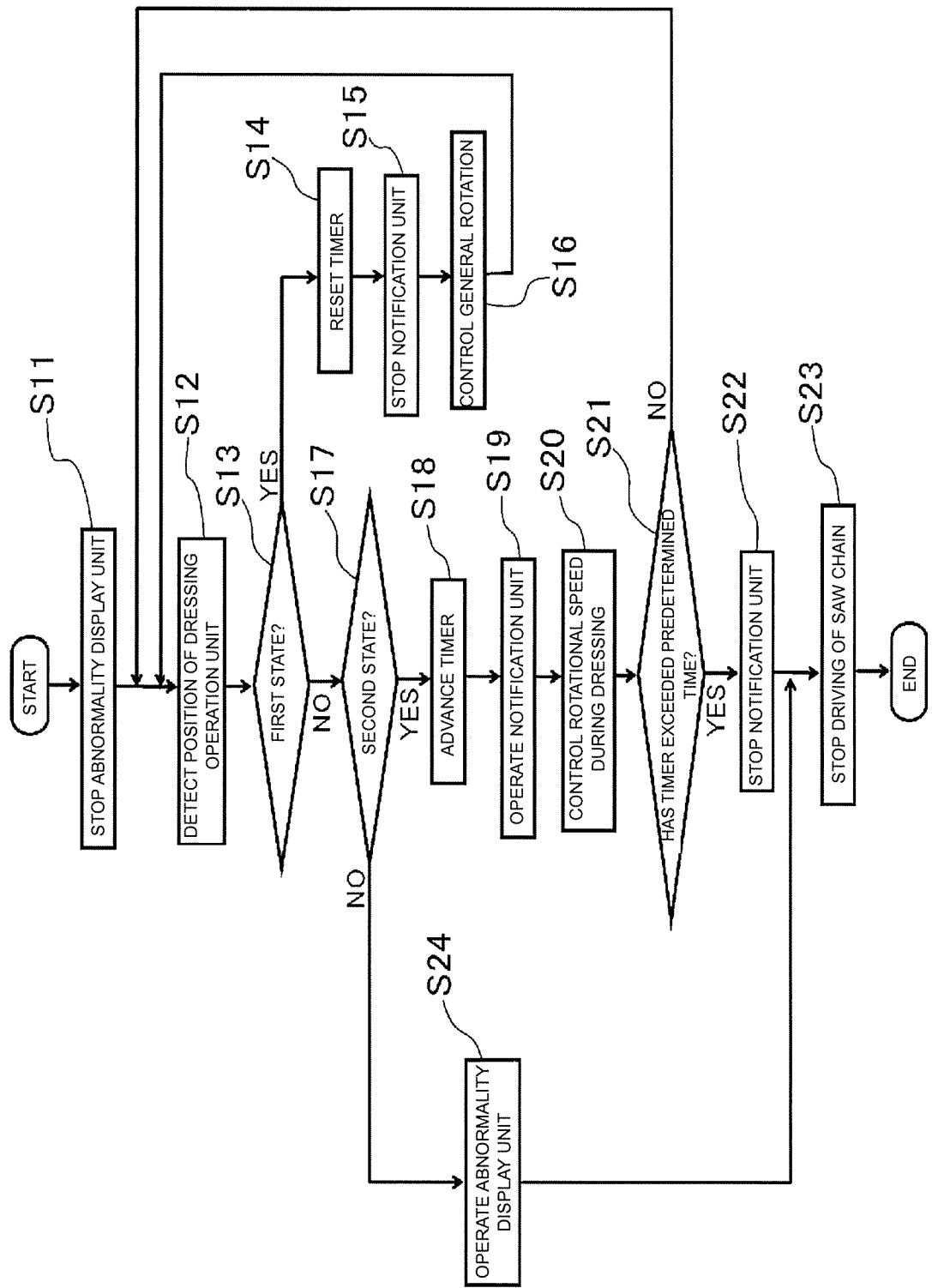
FIG. 8 is a flowchart showing operations corresponding to three states of the dressing operation lever in the chain saw according to the second embodiment of the disclosure.

FIG. 8 is a flowchart showing control performed by the operation unit 77. Here, control after the trigger switch 80 is turned on is shown. Here, first, the operation unit 77 resets (stops) the abnormality display unit 84 (S11). Then, as described above, a state of the dressing operation lever 15 is detected using the dressing operation detection circuit 82 (S12). Here, when it is ascertained that the dressing operation lever 15 is in the first state (YES in S13), the timer 85 and the notification unit 83 used during the dressing operation are reset (stopped) (S14 and S15), and the motor 70 is controlled such that it is in a general rotation state (a high rotational speed suitable for a cutting operation) (S16). Here, as described above, the rotational speed at this time may be determined according to the state of the trigger switch 80. In this state, the operator can perform a cutting operation. In this case, when it is confirmed that neither the notification unit 83 nor the abnormality display unit 84 is operating, the operator can ascertain that the state is a state in which a general cutting operation can be performed.

When it is ascertained that the dressing operation lever 15 is not in the first state (NO in S13) but is in the second state (YES in S17), the timer 85 advances at short time intervals (S18), the notification unit 83 is operated (S19), and control of a rotational speed during a dressing operation is performed (S20). The rotational speed at this time is set to be lower than a rotational speed set in the first state as described above or a general rotational speed set according to the state of the trigger switch 80 (S16). When the notification unit 83 operates, the operator can be aware that the dressing operation is being performed. Then, the operation unit 77 ascertains a time measured by the timer 85, and when this time does not exceed a predetermined time (a set time for a dressing operation) (NO in S21), detects a state of the dressing operation lever 15 again (S12). Then, when the second state continues (YES in S17), the timer 85 advances (S18), and the dressing operation continues as described above. If the dressing operation lever 15 is brought into the first state during the course of this (YES in S13), the dressing operation is interrupted, and a general cutting operation can be performed as described above. In addition, if the dressing operation lever 15 is brought into the third state during the course of this (NO in S17), the dressing operation is interrupted as will be described below.

When the second state continues, the timer 85 repeatedly advances (S18), and thus it is ascertained that a time measured by the timer 85 exceeds a predetermined time (YES in S21), the operation unit 77 stops the notification unit 83 (S22), and stops driving of the saw chain 31 (S23). In the chain saw 2, in order to stop driving of the saw chain 31, the motor 70 is stopped. Accordingly, the dressing operation is automatically terminated after the predetermined time has elapsed. In order to drive the saw chain 31 again from this state, the trigger switch 80 is turned on and the dressing operation lever 15 is brought into the first state (YES in S13), and at this time, the timer 85 is reset in order to prepare a next dressing operation (S14). During the dressing operation, a state in which the abnormality display unit 84 does not operate but the notification unit 83 operates continues.

On the other hand, when the dressing operation lever 15 is not in the first state (NO in S13) and is not in the second state, that is, when the state is ascertained as the third state (NO in S17), the operation unit 77 operates the abnormality display unit 84 (S24), and then stops driving of the saw chain 31 (S23). Thus, when the state is ascertained as the third state, the saw chain 31 is immediately stopped and the dressing operation is not performed at all. In this case, the operator can be aware from the abnormality display unit 84 the fact that, although the operator has tried to perform the dressing operation, since the current state is the third state and wearing of the grinding stone 40 and the saw chain 31 has progressed, the dressing operation is not performed. Even after the motor 70 is stopped, the abnormality display unit 84 is set such that it continuously operates for a predetermined time, and light is then turned off. In this case, after the trigger switch 80 is turned off and the grinding stone 40 and the saw chain 31 are replaced, the operator turns the trigger switch 80 on and can perform an operation again.

Moreover, the flowchart in FIG. 8 shows control when the trigger switch 80 is turned on. Here, when the trigger switch 80 is turned off, the saw chain 31 is stopped, and the saw chain 31 is driven from a state (the second state or the third state) in which the saw chain 31 is in contact with the grinding stone 40, since there is a risk of deterioration of the saw chain 31 similarly to the chain saw 1, which is not preferable. Therefore, in the chain saw 2, similarly to the flowchart in FIG. 5, when the trigger switch 80 is turned off, if the operation unit 77 ascertains the dressing operation lever 15 in the second or third state ascertained by the dressing operation detection circuit 82 and the stopped motor 70 (rotor) ascertained by the motor rotational speed detection circuit 75 at the same time, even if the trigger switch 80 is turned on, the control signal output circuit 76 can perform control such that the motor 70 is not driven. In addition, in such a case, when the abnormality display unit 84 used for notifying of the third state is also used for an operation, the operator can be notified of the reason for which the motor 70 is not driven according to display on the abnormality display unit 84. Here, in this case also, this may be expressed by a lighting method using the same LED element as in the notification unit 83.

Moreover, in the chain saw 2, a three-phase DC brushless motor is used. Since a rotational speed can be finely controlled in the brushless motor, this is suitable for control in this application. However, even if a motor of another type is used, the same control is possible by adding a separate circuit or the like. In addition, setting of the third state as described above and controlling of a power source according to the state, and controlling for automatically and appropriately setting a time for which the dressing operation is performed in the second state can be performed in the same manner as when the engine 50 is used as a power source as in the chain saw 1. In this case, when driving of the saw chain is stopped in FIG. 8 (S23), the engine 50 may not be completely stopped and may be in the idling state.

Figure 9:
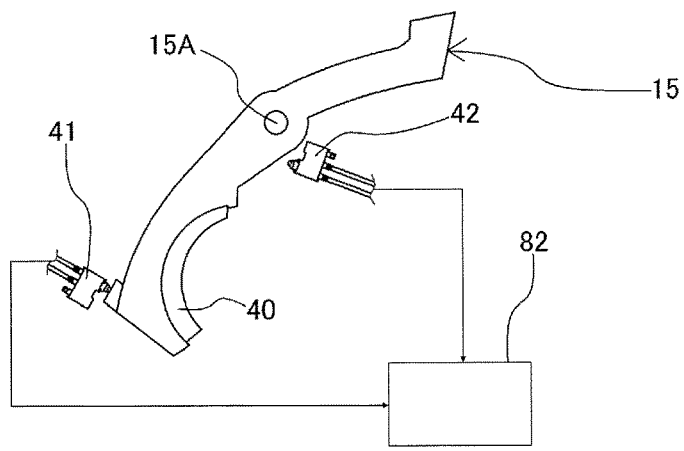
FIG. 9 is a diagram showing a modified example of the dressing operation lever in the chain saw according to the second embodiment of the disclosure.

As a configuration in which the first to third states of the dressing operation lever 15 can be detected as described above, a microswitch as in the chain saw 1 according to the first embodiment can be used without using the angle sensor. FIG. 9 is a diagram corresponding to FIG. 7 showing an example of such a configuration. Here, the microswitch (first microswitch) 41 in the chain saw 1 is similarly used. Thus, when the microswitch 41 is turned off (when it is not pushed), this can be ascertained as the first state, and when the microswitch 41 is turned on (when it is pushed), this can be ascertained as the second state. On the other hand, here, another microswitch (second microswitch) is provided on the opposite side with the dressing operation lever 15 therebetween. A microswitch 42 can be set such that it is turned off in the first and second states and it is turned on when it is in contact with the dressing operation lever 15 in the third state. Thus, the dressing operation detection circuit 82 to which the microswitches 41 and 42 are connected can ascertain that the state is the first state when the microswitch 41 is turned on (when the microswitch 42 is turned off), the state is the second state when both the microswitches 41 and 42 are turned off, and the state is the third state when the microswitch 42 is turned on (the microswitch 41 is turned off).

In addition, in the chain saw 2, when the trigger switch (rotational speed adjusting unit) 80 is not a simple rotation on and off switch, but it is a changeover switch in which a plurality of levels of rotational speeds are set according to an operation thereof, the operation unit 77 controls the trigger switch 80 using a solenoid coil or the like, and a rotational speed of the motor 70 in the second and third states can be controlled (stopped). In addition, in the above example, the abnormality display unit 84 operates when driving of the saw chain 31 is stopped so that the dressing operation cannot be performed. Alternatively, a restriction can be added in the driving state of the saw chain 31 so that the dressing operation cannot be performed. In this case, when this restriction is added, the abnormality display unit 84 can be operated.

(Third Embodiment)

Figure 10:
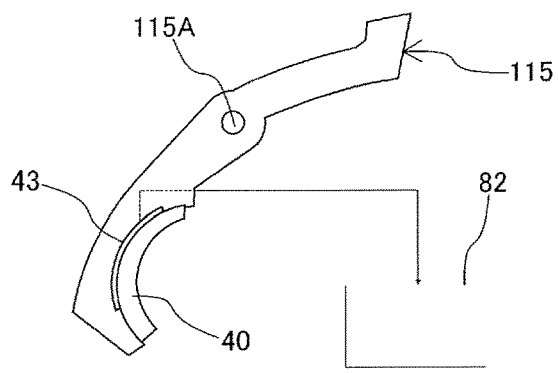
FIG. 10 is a diagram showing a dressing operation lever in a chain saw according to a third embodiment of the disclosure.

In the chain saws 1 and 2, and the modified examples thereof, in order to ascertain the first and second states (or additionally the third state), the detection unit is configured to detect a position (rotation position) of the dressing operation lever 15. However, the scope of this application is not limited thereto. For example, the detection unit may detect the fact that the grinding stone 40 and the saw chain 31 are actually in contact with each other (contact state) instead of detecting the position of the dressing operation lever. FIG. 10 shows an example of such a configuration and is a diagram corresponding to FIGS. 7 and 9. In such a configuration, a dressing operation lever 115 which rotates around a rotation shaft 115A is used in the same manner as in the dressing operation lever 15. However, here, the grinding stone 40 is mounted in the dressing operation lever 115 with a pressure sensor (detection unit) 43 therebetween. In this case, when the grinding stone 40 and the saw chain 31 are in contact with each other, the pressure sensor 43 detects a pressure at this time, and the dressing operation detection circuit 82 to which the pressure sensor 43 is connected can accurately ascertain that the grinding stone 40 and the saw chain 31 are in contact with each other. In such a configuration, it is not possible to ascertain the third state, but it is possible to particularly accurately ascertain the fact that the grinding stone 40 and the saw chain 31 are in contact with each other independently of a wear state of the grinding stone 40 or the like. In order to ascertain the third state, the same microswitch 42 as in FIG. 9 may be provided.

Figure 11:
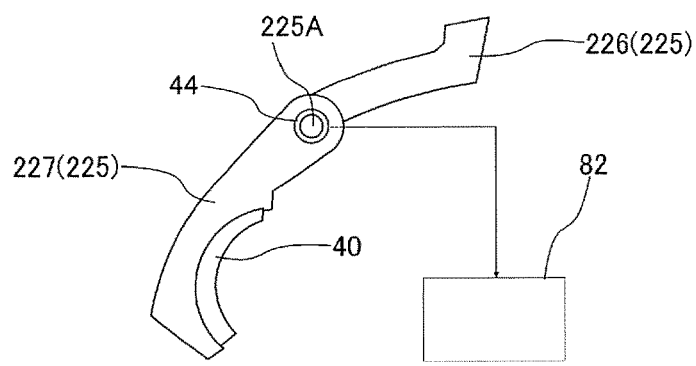
FIG. 11 is a diagram showing a modified example of the dressing operation lever in the chain saw according to the third embodiment of the disclosure.

In addition, the same configuration as in the modified example having the above configuration is shown in FIG. 11. Similarly, a dressing operation lever 225 used here rotates around a rotation shaft 225A. However, the dressing operation lever 225 has a 2-piece structure including a dressing operation lever upper portion 226 on the upper side (a side that is operated by the operator) and a dressing operation lever lower portion 227 on the lower side (a side in which the grinding stone 40 is mounted). Both the dressing operation lever upper portion 226 and the dressing operation lever lower portion 227 are supported by the rotation shaft 225A. In addition, the dressing operation lever lower portion 227 is rotatable around the rotation shaft 225A with respect to the dressing operation lever upper portion 226. However, the dressing operation lever lower portion 227 is biased counterclockwise by a spring (not shown) with respect to the dressing operation lever upper portion 226 in FIG. 11 and a stopper (not shown) is provided to prevent counterclockwise rotation further than in the state shown in FIG. 11.

Thus, when the operator operates the dressing operation lever upper portion 226 to rotate the dressing operation lever 225 counterclockwise, and the grinding stone 40 is in contact with the saw chain 31, it is not possible to further rotate the dressing operation lever lower portion 227 from this state, and only the dressing operation lever upper portion 226 is rotated counterclockwise. Accordingly, from the state in FIG. 11, a set angle of the dressing operation lever lower portion 227 with respect to the dressing operation lever upper portion 226 changes. Thus, when a rotary switch (detection unit) 44 configured to switch on and off when a set angle between the dressing operation lever lower portion 227 and the dressing operation lever upper portion 226 changes in this manner is provided at the rotation shaft 225A, the fact that the grinding stone 40 and the saw chain 31 are in contact with each other can be detected according to a change in the set angle of the dressing operation lever lower portion 227 with respect to the dressing operation lever upper portion 226. That is, when the set angle does not change in the state in FIG. 11, this can be ascertained as the first state, and when the set angle changes, this can be ascertained as the second state. In this case, in order to ascertain the third state, the same microswitch 42 as in FIG. 9 may be provided on a side opposite to that of FIG. 9 so that it operates in contact with the dressing operation lever upper portion 226 when the dressing operation lever upper portion 226 rotates counterclockwise to a great extent.

In this manner, particularly, in order to identify the first state and the second state, various detection units can be used. For example, when the above microswitch is used in combination, it is possible to also ascertain the third state.

(Fourth Embodiment)

Figure 12A:
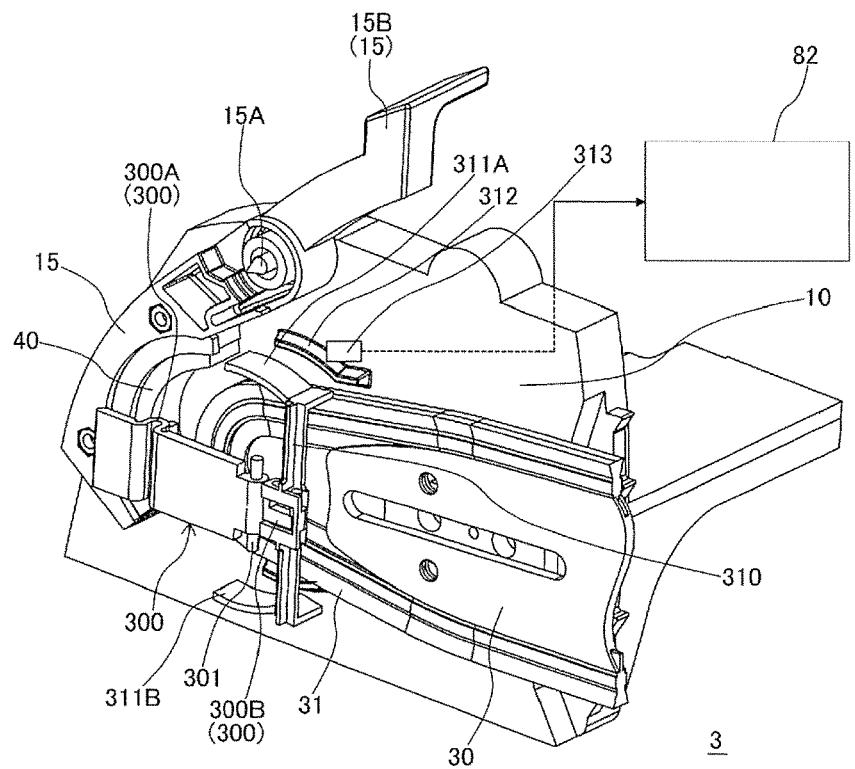
FIG. 12(a) and FIG. 12(b) are perspective views showing a structure around a dressing operation lever in a chain saw according to a fourth embodiment of the disclosure.
Figure 12B:
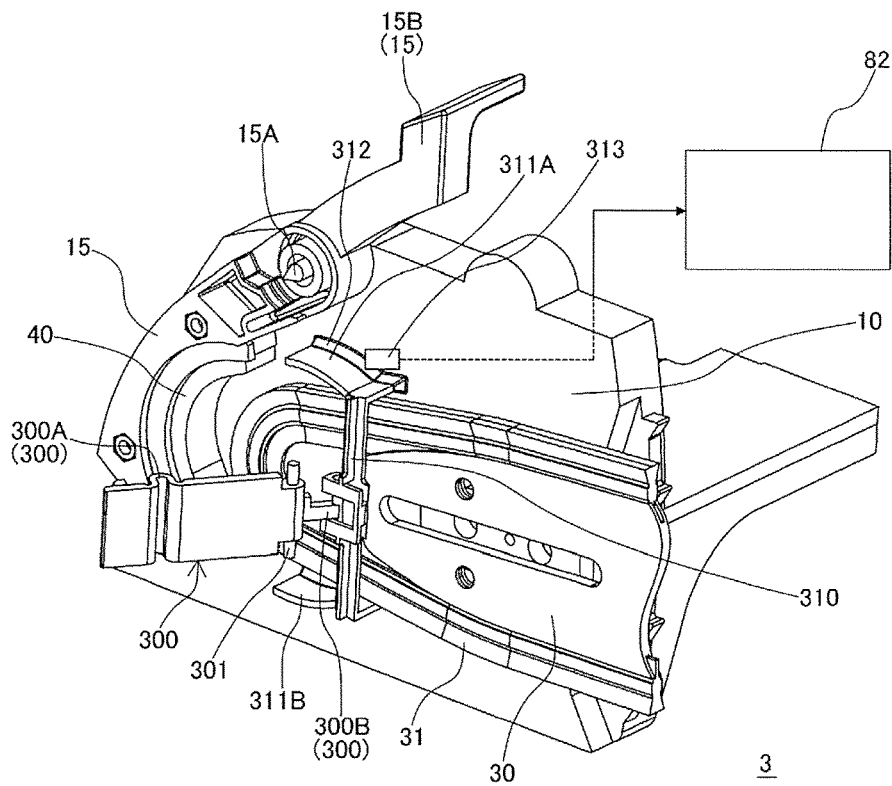

As described above, the first state is a state in which a general cutting operation is performed and the second state and the third state are a state in which no general cutting operation is performed. Thus, it is not preferable that the first state be erroneously changed to the second state during a general cutting operation. In a chain saw 3 according to the fourth embodiment, a lock lever configured to prevent the first state from being changed unexpectedly to the second state is used. FIG. 12(*a*) and FIG. 12(*b*) are perspective views showing a configuration around a dressing operation lever of the chain saw 3. In the same manner as in FIG. 1, actually, the structure is covered by a cover (not shown), but description of the cover is omitted. Here, the same dressing operation lever 15 as in FIG. 1 is used, and descriptions of the microswitch 41 and the like are omitted.

Here, the lock lever 300 is used to prevent the dressing operation lever 15 from rotating toward a side in which it is brought into the second state from the first state. In this case, the detection unit can detect an operation (a position) of the lock lever 300 instead of detecting an operation (a position) of the dressing operation lever as described above, and perform the same operation. The lock lever 300 is rotatable around a pin 301 that extends in a vertical direction and the pin 301 is fixed to a cover (not shown). Thus, actually, the lock lever 300 is mounted in the cover (not shown). When the left end of the lock lever 300 in FIG. 12(*a*) and FIG. 12(*b*) is operated, it is possible to switch between the state in FIG. 12(*a*) and the state in FIG. 12(*b*).

FIG. 12(*a*) shows a state in which the left end of the lock lever 300 is pushed and the dressing operation lever 15 is locked. In the lock lever 300, a grinding stone engaging portion 300A for preventing the grinding stone 40 from moving (rotation of the dressing operation lever 15) toward the saw chain 31 when it comes in contact with the grinding stone 40 between the saw chain 31 and the grinding stone 40 in this state is provided. Therefore, in the state in FIG. 12(*a*), it is not possible to bring the dressing operation lever 15 into the second state.

FIG. 12(*b*) shows a state in which the left end of the lock lever 300 is pulled forward and rotates (a state in which locking is released). In this state, the grinding stone 40 can move toward the saw chain 31 so that the grinding stone engaging portion 300A moves forward, and the dressing operation lever 15 can rotate counterclockwise to transition to the second state. On the other hand, on the right side of the lock lever 300, a scattering protection cover mounting portion 310 which is long in a vertical direction and is movable between the front side and the back side is mounted in a cover (not shown) like the pin 301. The right end of the lock lever 300 extends in the left and right direction and is engaged to the scattering protection cover mounting portion 310 through a link mechanism, and forms an arm 300B that controls a position of the scattering protection cover mounting portion 310 according to a movement thereof. In such a configuration, unlike the grinding stone engaging portion 300A, in the state in FIG. 12(*a*), the scattering protection cover mounting portion 310 is positioned on the front side and moves to the back side in the state in FIG. 12(*b*).

Scattering protection covers 311A and 311B covering the saw chain 31 from the upper side and the lower side in the state in FIG. 12(*b*) are fixed to upper and lower ends of the scattering protection cover mounting portion 310, respectively. As described above, actually, the structure in FIG. 1 and FIG. 12(*a*) and FIG. 12(*b*) is actually covered with a cover (not shown). However, in the chain saw 3, in the state in FIG. 12(*b*), a portion of the saw chain 31 near the grinding stone 40 is additionally covered with the scattering protection covers 311A and 311B. Thus, when the dressing operation lever 15 rotates counterclockwise from the state in FIG. 12(*b*) and is brought into the second state, and the dressing operation is performed, scattering of sparks and dust is prevented by the scattering protection covers 311A and 311B.

In this case, a rib 312 that comes in contact with the scattering protection cover 311A from the upper side in the state in FIG. 12(*b*) is provided on the side of the main body 10. A microswitch (third microswitch: detection unit) 313 configured to detect the fact that the rib 312 and the scattering protection cover 311A are in contact with each other is provided. The microswitch 313 can be connected to the dressing operation detection circuit 82 in the same manner as described above. In the first to third embodiments, the detection unit detects an operation (a position) of the dressing operation lever itself, but in this case, detects an operation (a position) of the lock lever 300 in advance instead. Actually, after the lock lever 300 is brought into the state in FIG. 12(*b*), the dressing operation lever 15 is brought into the second state. However, when the fact that locking of the lock lever 300 is released has been ascertained previously, it is possible to control a rotational speed in the second state earlier. Thus, it is possible to appropriately adjust a rotational speed during the dressing operation earlier. Detection of the third state and control of a rotational speed in the third state can be performed in the same manner as in the second embodiment. Here, the rib 312 corresponding to the lower-side scattering protection cover 311B is provided on the lower side, and when the lock lever 300 is unlocked (FIG. 12(*b*)), the scattering protection covers 311A and 311B and the rib 312 are combined. Therefore, particularly, an effect of preventing sparks and dust can be strengthened. In this case, in the chain saw 2 according to the second embodiment, the notification unit 83 notifies of the fact that the state is the second state, but the notification unit 83 may notify of the fact that locking by the lock lever 300 is released.

Here, in the chain saw 1 according to the first embodiment, control for decreasing the rotational speed R of the crankshaft 51 of the engine 50 or preventing the rotational speed R from increasing when the engine 50 is in the idling state is performed using an ignition system of the engine 50. In addition, in the chain saw 2 according to the second embodiment, control of the motor 70 corresponding thereto is performed through the control signal output circuit 76, the inverter 72, and the like. On the other hand, in addition to or instead of such control, a brake for braking a driving shaft can be used.

Generally, as described in Patent Literature 1, a brake for braking a driving shaft (driving gear) for safety in the event of emergency, for example, when a kickback occurs during a cutting operation and the chain saw bounces backward (to the operator side) is provided in the chain saw. Generally, a screen-like hand guard is mounted at the front side of the front handle 12 in FIGS. 1 and 2, and the brake is set to operate when the hand guard falls forward. Thus, when a kickback occurs, a hand of the operator gripping the front handle 12 tilts the hand guard forward, the driving shaft is braked, and a cutting operation can be performed safely. As the brake, for example, as described in Patent Literature 1, a brake using a brake band for fastening the outer periphery of the clutch drum fixed to the driving shaft (driving gear) side is used.

This brake can be used in combination when control for decreasing the rotational speed R of the crankshaft and preventing a rotational speed from increasing in the idling state is performed. In particular, when this brake is used in combination when the rotational speed R of the crankshaft is decreased, this is effective because it is possible to decelerate the driving shaft and the saw chain quickly. Further, as described above, when an actual time required for the dressing operation is short, during the dressing operation, without performing control of the engine as described above, the driving shaft may be decelerated using only the brake. This is the same as when the motor 70 is used as a power source as in the chain saw 2.

In addition, in the above configuration, the dressing operation lever (dressing operation unit) 15 to which the grinding stone (dressing member) 40 is fixed is used. However, the grinding stone need not be fixed to the dressing operation unit. As long as a positional relationship between the grinding stone and the saw chain can be adjusted according to two states (the first state and the second state, or additionally the third state) of the dressing operation unit, a configuration of the dressing operation unit or a configuration of the dressing operation unit and the grinding stone is arbitrary. In addition, while the dressing operation unit is configured as a mechanical lever, a configuration in which an electrical switch is provided, a grinding stone is controlled according to an operation of the switch, and thus dressing is performed may be used. In this case, no detection unit is required and the saw chain is optimally controlled by the control portion. In addition, in this case, a notification unit configured to notify the operator of the fact that the dressing operation is operating suitably may be provided.

The invention claimed is:

1. A chain saw including a power shaft that rotates in a power source provided in a main body and a saw chain that is driven by the power shaft, the chain saw including:
   a dressing unit configured to perform dressing of the saw chain, wherein the dressing unit comprises:
   a dressing member configured to perform dressing of the saw chain by contact with the saw chain that is in a driven state;
   wherein the chain saw further includes a controller configured to, in a case that the dressing unit is operated, perform a control different from a case that the dressing unit is not operated, and
   a detection unit in which a first state in which a position of the dressing member is on a side away from the saw chain according to an operation by an operator and a second state in which a position of the dressing member is on a side close to the saw chain are set, and in which a transition of the dressing member from the first state to the second state, or a change from a state in which the transition from the first state to the second state according to an operation by an operator is not allowed to a state in which the transition is allowed, is detected,
   wherein, when the detection is performed by the detection unit, the controller determines that the dressing unit is operated,
   wherein the controller is connected to the detection unit and controls rotation of the power shaft based on a detection result of the detection unit,
   a rotational speed adjusting unit configured to control a rotational speed of the power shaft according to an operation by an operator,
   wherein, when the detection unit detects that the dressing member has transitioned from the first state to the second state or when the detection unit detects that the state in which the transition of the dressing member from the first state to the second state is not allowed has changed to the state in which the transition is allowed, the controller performs control such that a rotational speed of the power shaft is reduced irrespective of an operation of the rotational speed adjusting unit.

2. The chain saw according to claim 1, comprising
a rotational speed ascertaining unit configured to ascertain a rotational speed of the power shaft,
wherein, when the detection unit detects that the dressing member has transitioned from the first state to the second state or the state in which the transition of the dressing member from the first state to the second state is not allowed has changed to the state in which the transition is allowed, the controller feeds back the rotational speed ascertained by the rotational speed ascertaining unit and reduces a rotational speed of the power shaft to be within a preset range.

3. The chain saw according to claim 1,
wherein, when a predetermined time elapses after the detection unit ascertains that the dressing member has transitioned from the first state to the second state, the controller stops driving of the saw chain.

4. The chain saw according to claim 1,
wherein, when the detection unit detects that the dressing member is in the second state and the saw chain is not driven, the controller restricts driving of the saw chain.

5. The chain saw according to claim 1,
wherein a third state is set, in which for the dressing member, a position of the dressing member is on a side closer to the saw chain than that is in the second state according to an operation by an operator, and the third state is ascertained by the detection unit, and
wherein, when the detection unit ascertains that the dressing member is in the third state, the controller stops driving of the saw chain.

6. The chain saw according to claim 1, comprising:
a brake for braking rotation of a driving shaft that drives the saw chain,
wherein, when the detection unit detects that the dressing member has transitioned from the first state to the second state or the state in which the transition of the dressing member from the first state to the second state is not allowed has changed to the state in which the transition is allowed, the controller brakes rotation of the driving shaft using the brake.

7. The chain saw according to claim 1,
wherein a notification unit configured to notify an operator that the dressing member is in the second state or the state is the state in which the transition from the first state to the second state is allowed is connected to the controller.

8. The chain saw according to claim 7,
wherein an abnormality display unit configured to issue a warning to the operator when control for stopping or restricting driving of the saw chain is performed is connected to the controller.

9. The chain saw according to claim 1,
wherein the detection unit detects a position of the dressing member.

10. The chain saw according to claim 1,
wherein the detection unit detects a contact state between the dressing member and the saw chain.

11. The chain saw according to claim 1,
wherein the dressing unit comprises a lock lever in which the state in which the transition of the dressing member from the first state to the second state is not allowed and the state in which the transition is allowed are set,
wherein the detection unit detects a state of the lock lever.

12. The chain saw according to claim 1,
wherein the dressing member is biased toward a side to be in the first state.

13. The chain saw according to claim 1,
wherein the power source is an engine, and the power shaft is a crankshaft of the engine.

14. The chain saw according to claim 1,
wherein the power source is a motor, and the power shaft is a rotation shaft of the motor.

* * * * *